(12) United States Patent
Craik et al.

(10) Patent No.: US 9,811,945 B2
(45) Date of Patent: *Nov. 7, 2017

(54) ON-DEMAND TRANSFORMATION AWARE SHAPE TESSELLATION

(71) Applicant: Google Inc., Mountain View, CA (US)

(72) Inventors: Christopher Craik, Mountain View, CA (US); Romain Guy, Millbrae, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/465,558

(22) Filed: Mar. 21, 2017

(65) Prior Publication Data

US 2017/0193698 A1  Jul. 6, 2017

Related U.S. Application Data

(63) Continuation of application No. 14/057,496, filed on Oct. 18, 2013, now Pat. No. 9,639,982.

(51) Int. Cl.
*G06T 17/20* (2006.01)
*G06T 15/50* (2011.01)
*G06T 1/20* (2006.01)
*G06T 11/20* (2006.01)

(52) U.S. Cl.
CPC .............. *G06T 17/20* (2013.01); *G06T 1/20* (2013.01); *G06T 11/20* (2013.01); *G06T 15/503* (2013.01); *G06T 2200/24* (2013.01)

(58) Field of Classification Search
None
See application file for complete search history.

(56) References Cited

U.S. PATENT DOCUMENTS

| | | |
|---|---|---|
| 8,044,955 B1 | 10/2011 | Yhann |
| 2007/0153004 A1 | 7/2007 | Airey |
| 2008/0307415 A1 | 12/2008 | Carter |
| 2009/0237400 A1 | 9/2009 | Patel |
| 2009/0237401 A1 | 9/2009 | Wei et al. |
| 2012/0092340 A1 | 4/2012 | Sarnoff et al. |
| 2013/0106851 A1 | 5/2013 | Tremblay |

OTHER PUBLICATIONS

Centre for Innovation in Mathematics Teaching, "Unit 7 Section 3: Enlargements", posted Oct. 7, 2011, www.cimt.plymouth.ac.uk!projects/mepres/book9/bk9i7/bk9_7i3.html.

A. Colomitchi, "Approximating cubic Bezier curves by quadratic ones", Caffeine Owl web page, Sep. 2006, available via the Internet at www.caffeineowl.com/graphics/2d/vectorial/cubic2quad01.html (last visited Oct. 25, 2013).

(Continued)

*Primary Examiner* — Michelle Chin
(74) *Attorney, Agent, or Firm* — McDonnell Boehnen Hulbert & Berghoff LLP

(57) ABSTRACT

Disclosed are apparatus and methods for tessellating shapes. A computing device that has a display can receive an instruction to draw a shape. The computing device can determine a scale factor for the shape. The computing device can determine a set of polygons that tessellate the shape based on the scale factor. The set of polygons can include at least two polygons. The computing device can display the polygons in the determined set on the display.

20 Claims, 13 Drawing Sheets

(56) References Cited

OTHER PUBLICATIONS

A. Colomitchi,"Inflection points of a cubic Bezier", Caffeine Owl web page, Sep. 2004, available via the Internet at www.caffeineowl.com/graphics/2d/vectorial/cubic-inflexion.html (last visited Oct. 25, 2013).

A. Colomitchi, "Introduction to cubic and quadratic Bezier curves", Caffeine Owl web page, Sep. 2004, available via the Internet at www.caffeineowl.com/graphics/2d/vectorial/bezierintro.html (last visited Oct. 25, 2013).

B. Dudash, "Dynamic Hardware Tessellation Basics",Dec. 19, 2012, NVIDIA Corporation, available via the Internet at developer.nvidia.com/content/dynamic-hardware-tessellation-basics (last visited Oct. 25, 2013).

R. Guy, "Android Recipe #1, Image with round corners", Dec. 11, 2012, available via the Internet at www.curious-creature.org/2012/12/11/android-recipe-1-image-with-rounded-corners/ (last visited Oct. 25, 2013).

R. Guy, "Android Recipe #2, Fun with shaders", Dec. 13, 2012, available via the Internet at www.curious-creature.org/2012/12/13/android-recipe-2-fun-with-shaders/ (last visited Oct. 25, 2013).

C. Loop et al., "Rendering Vector Art on the GPU", GPU Gems 3, Ch. 25, Dec. 2007, NVIDIA Corporation, available via the Internet at developer.nvidia.com/content/gpu-gems-3-chapter-25-rendering-vector-art-gpu (last visited Oct. 25, 2013).

NVIDIA Corporation,"Whitepaper NVIDIA GF100 World's Fastest GPU Delivering Great Gaming Performance with True Geometric Realism",v1.5, Aug. 5, 2010, available via the Internet of www.nvidia.com/object/IO_86775.html (last visited Oct. 25, 2013).

I. Oliveira, "Cairo state tracker: filling rules(the power of stencil buffer)", Jul. 10, 2010, available via the Internet at igortrindade.wordpress.com/2010/07/10/cairo-state-tracker-filling-rulesthe-power-of-stencil-buffer/ (last visited Oct. 25, 2013).

P. Rideout, "Triangle Tessellation with OpenGL 4.0", The Little Grasshopper blog, Sep. 6, 2010, available via the Internet at prideout.net/blog/?p=48 (last visited on Oct. 25, 2013).

S. Roche "Answers and Teachers' Notes", Published 2001 for the Ministry of Education by Learning Media Limited, Box 3293, Wellington, New Zealand, www.nzmaths.co.nz/sites/default/files/FI0/12975.pdf.

B. Smus, "Let's get physical (units)", posted May 2, 2012, smus.com/physical-units/.

S. Tariq, "D3D11 Tessellation", Mar. 23, 2009, Game Developer's Conference, San Francisco, available via the Internet at developer.download.nvidia.com/presentations/2009/GDC/GDC09_D3D11Tessellation.pdf (last visited on Oct. 25, 2013).

Wikimedia Foundation, "Alpha Compositing", Oct. 17, 2013, availalbe via the Internet at en.wikipedia.org/w/index.php?title=Alpha_compositing&oldid=577570534 (last visited on Oct. 25, 2013).

ON-DEMAND TRANSFORMATION AWARE SHAPE TESSELLATION

CROSS-REFERENCE TO RELATED APPLICATIONS

This application is a continuation of U.S. patent application Ser. No. 14/057,496, entitled "On-Demand Transformation Aware Shape Tessellation", filed Oct. 18, 2013, the contents of which are fully incorporated by reference herein for all purposes.

BACKGROUND

Unless otherwise indicated herein, the materials described in this section are not prior art to the claims in this application and are not admitted to be prior art by inclusion in this section.

Many modern computing devices, including mobile phones, personal computers, and tablets, provide graphical user interfaces (GUIs) for permitting users to interact with the computing device. For example, application programs can use the GUI to communicate with a user using images, text, and graphical elements such as windows, dialogs, pop-ups, images, buttons, scrollbars, and icons. The GUI can also receive inputs from user-interface devices such as touch screens, computer mice, keyboards, and other user-interface devices to permit the user to control the GUI, and thus the application program.

In some cases, the GUI can be used to interact with an operating system (OS) to manage the computing device. For example, the OS can have a control panel or setting application that uses the GUI to draw one or more windows related to control settings for some aspect(s) of the computing device, such as audio controls, video outputs, computer memory, and human language(s) used by the OS (e.g., choose to receive information in English, French, Mandarin, Hindi, Russian, etc.). The control panel/settings application can receive subsequent input related to the window(s) using the GUI. The GUI can provide the inputs to the OS, via the control panel/settings application, to manage the computing device.

SUMMARY

In one aspect, a method is provided. A computing device having a display receives an instruction to draw a shape. The computing device determines a scale factor for the shape. The computing device determines a set of polygons for tessellating the shape based on the scale factor, where the set of polygons includes two or more polygons. The computing device displays the polygons in the determined set on the display.

In another aspect, a computing device is provided. The computing device includes a graphics processing component, a display, a processor, and a non-transitory computer-readable storage medium. The non-transitory computer-readable storage medium has instructions stored thereon that, when executed by the processor, cause the computing device to perform functions. The functions include: receiving an instruction to draw a shape; determining a scale factor for the shape; determining a set of polygons that tessellate the shape using the computing device based on the scale factor, where the set of polygons includes two or more polygons; and displaying the polygons in the determined set on the display using the graphics processing component.

In another aspect, an article of manufacture is provided. The article of manufacture includes a non-transitory computer-readable storage medium having instructions stored thereon that, when executed by a processor of a computing device, cause the computing device to perform functions. The functions include: receiving an instruction to draw a shape; determining a scale factor for the shape; determining a set of polygons that tessellate the shape based on the scale factor, where the set of polygons includes two or more polygons; and displaying the polygons in the determined set.

In another aspect, a device is provided. The device includes: means for receiving an instruction to draw a shape; means for determining a scale factor for the shape; means for determining a set of polygons that tessellate the shape based on the scale factor, where the set of polygons includes two or more polygons; and means for displaying the polygons in the determined set.

DETAILED DESCRIPTION

Overview

Figure 1:
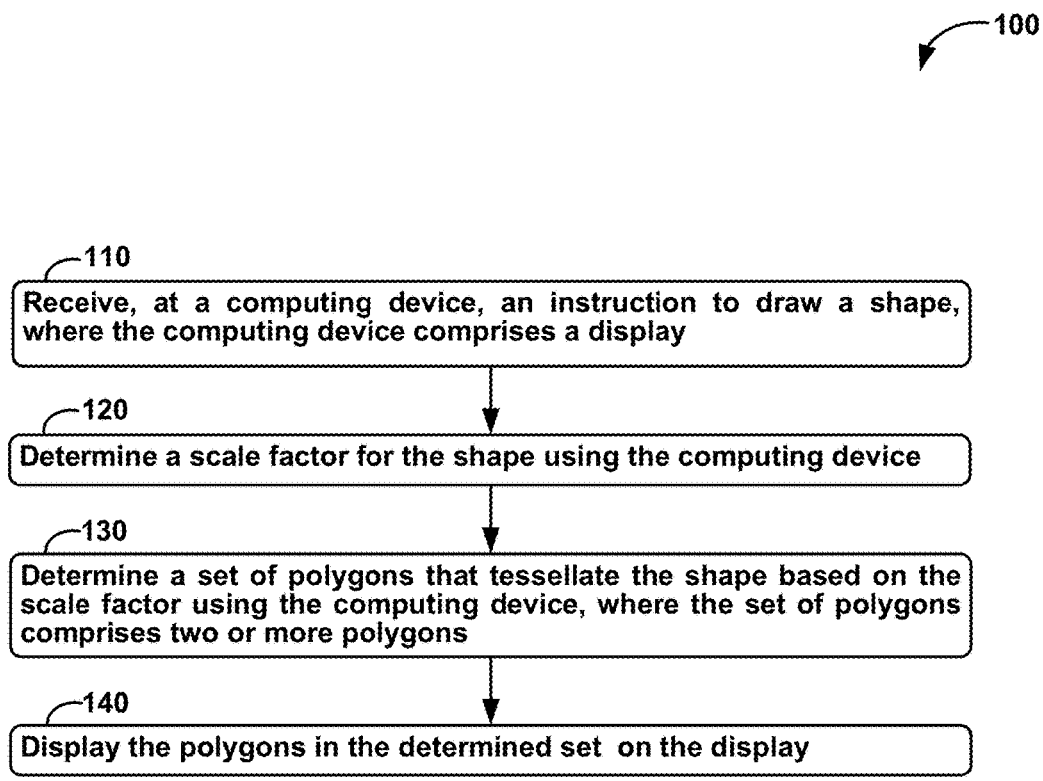
FIG. 1 is a flow chart of a method, in accordance with an example embodiment.

Disclosed herein are techniques for tessellating shapes, such as polygons, as needed. Many computing devices, such as many modern mobile phones, are equipped with one or more graphics processing components, such as one or more Graphics Processing Units (GPUs), and related software for utilizing the graphics processing components, such as graphics libraries. Many graphics processing units are configured to rapidly draw simple shapes, such as triangles rapidly.

Tessellation is a process of covering a shape without gaps or overlaps by simpler figures of one type (or a few types). The figures that cover the shape can be called tiles, and another term for tessellation is "tiling". For examples, a checkerboard is tessellated with square tiles, and a slice through a beehive is tessellated with hexagonal tiles.

It is possible to tessellate two-dimensional shapes using triangles as tiles. That is, any shape likely to be drawn using a (primarily) two-dimensional graphical user interface (GUI) can be tessellated with triangles as tiles. In order to speed drawing of shapes by a GUI, the shapes can be tessellated with triangles and a graphics processing unit can be used to rapidly draw the triangles, and so draw the shape.

In many cases, multiple tessellations are possible for the same object. For example, a very small circle can be approximated using a regular polygon with a small number of sides, such as a square or a hexagon. For larger circles, however, a polygon with a larger number of sides may be used; e.g., a 50-sided polygon. Each of these polygons can in turn be tessellated using triangles; e.g., the square can be tessellated by two or more triangles or the hexagon can be tessellated by four or more triangles.

The number of polygons used as tiles to tessellate a shape can depend on a number of factors. One is the intrinsic complexity of the shape—a triangle can be tessellated by one triangle (itself), a square can be tessellated by two triangles, but a shape of a teapot outline would likely require more than two triangles. Another consideration is curvature in part or all of the shape—more tiles may be needed to tessellate a curved shape, such as a circle or ellipse, than a similarly sized shape with straight sides, such as a square or rectangle.

A further consideration is a "scale factor" for the shape that represents expansion or contraction of the shape with respect to an original size of the shape. An example scale factor is the ratio of a current size of the shape to the original size of the shape. For example, a square that is originally two centimeters on a side that has been expanded to a square three centimeters on a side has a scale factor in both X and Y dimensions of 3/2=1.5. As another example, a square that is originally two centimeters on a side that has been contracted to a square 1.5 centimeters on a side has a scale factor in both X and Y dimensions of 1.5/2=0.75. As a third example, a square that is originally two centimeters on a side transformed to be a rectangle that is 4 centimeters in the X dimension and 3 centimeters in the Y dimension can have two scale factors: an X-dimension scale factor of 4/2=2, and a Y-dimension scale factor of 3/2=1.5. Other examples are possible.

In some cases, a shape that is to be rendered by a graphics processing component can be accompanied by a transformation matrix. The transformation matrix can specify transformations of the shape, such as affine transformations including translations, scaling, and rotations of the shape. In some examples, scale factors for the shape can correspond to diagonal values of the transformation matrix. For example, using a 3×3 transformation matrix M, the M(1, 1) value can be a scale factor in the X dimension, and the M(2, 2) value can be a scale factor in the Y dimension. In some cases, the M(3, 3) value can be a scale factor in a Z (depth) dimension, while in other cases, the M(3, 3) value can correspond to a value that is unused for affine transformations but used in other transformations, such as a two-dimensional perspective transformation.

If a shape has been expanded; i.e., the scale factor(s) for the shape exceed one, then a tessellation of the original shape, particularly shapes with sloped or curved lines, can generate visible artifacts that can detract from the appearance of a rendering of the tessellated shape. This is similar to seeing details under a microscope or using a telescope that were not visible to the naked eye—once expanded, the details become visible. In the case of a tessellation of a sloped or curved line, the triangles or other tiling shapes become visible and can lead to "jaggies" or stair-step-shaped lines rather than sloped or curved lines, as well as other artifacts. To address this problem, when the shape is expanded, the tessellation of the shape can be recalculated using additional triangles or other tiling shapes or "retessellated". For example, if a curved line with a scale factor of S1 is tessellated with N1 triangles, the curved line with a scale factor of k1*S1, with k1>1, can be retessellated using f(k1, S1)*N1 triangles for some function f( ), where f(k1, S1)>1.

If the shape has been contracted, i.e., the scale factor(s) for the shape are less than one, then a tessellation of the original shape may have more tiles than needed to draw the shape without visible artifacts and so can utilize more resources than necessary to accurately render the shape. To address this problem, the original shape can be retessellated using fewer triangles or other tiling shapes than used for the original shape. For example, if a curved line with a scale factor of S1 is tessellated with N1 triangles, the curved line with a scale factor of k2*S1, with 0>k>1, can be retessellated using f(k2, S1)*N1 triangles for some function f( ), where f(k2, S1)<1.

In some cases where the shape has been contracted or expanded, retessellation may not be necessary to avoid visible artifacts or to reduce use of graphical processing unit and other resources. For example, the shape can be contracted or expanded by a relatively small amount; e.g., a scale factor for the shape can be between 0.9 and 1.1 (or similar values).

Therefore, a computing device can determine a set of N polygons with N>0 needed to tessellate a shape based on the shape and the scale factors for the shape. Then, if the shape later needs to be redrawn, the computing device can examine current scale factors for the shape and scale factors used to tessellate the shape to determine whether or not retessellation is needed. If retessellation is needed, the computing device can determine a new set of N1 polygons to retessellate the shape, where N1>0. Typically, N1≠N. In some cases, the computing device can determine the number N1 of polygons to retessellate the shape and then determine the corresponding set of polygons.

In some cases, a shape can be anti-aliased. Anti-aliasing is a technique to minimize artifacts, or aliases, when representing a higher resolution image at a lower resolution. One technique to anti-alias a shape, such as the tessellated shapes discussed above, is to add a boundary region to the shape of a known size to the shape; e.g., a one-pixel wide boundary. The boundary can change thickness based on distortions to the shape; e.g., scale factors that differ between dimensions.

Determining tessellation of shapes for computing devices with one or more graphical processing units can speed rendering of the shapes by converting the shapes into simpler shapes, such as triangles, that can be rendered using the graphical processing unit(s). Additionally, determining whether the shape is to be retessellated using the techniques discussed above can both reduce visible artifacts and improve resource utilization of graphical processing units.

Example Operations

FIG. 1 is a flow chart of method 100, in accordance with an example embodiment. Method 100 begins at block 110, where a computing device having a display can receive an instruction to draw a shape.

At block 120, the computing device can determine a scale factor SF for the shape. In some embodiments, the instruction can be associated with a transformation matrix. Then, determining the scale factor SF for the shape can include determining the scale factor SF for the shape based on the transformation matrix.

At block 130, the computing device can determine a set of polygons that tessellate the shape based on the scale factor SF, where the set of polygons includes N polygons for N≥2. That is, N can be the cardinality of the set of polygons. In some embodiments, the computing device can determine the set of polygons without explicitly determining N. In other embodiments, the computing device can determine the set of polygons and then determine a value for Ns. In still other embodiments, the computing device can determine a value for N based on the scale factor SF and then determine the set of polygons for tessellating the shape.

In other embodiments, the scale factor SF can include a scale factor SFX in an X dimension and a scale factor SFY in a Y dimension. Then, determining the set of polygons that tessellate the shape based on the scale factor can include determining the set of polygons based on scale factor SFX in the X dimension and/or on scale factor SFY in the Y dimension.

At block 140, the computing device can display the determined set of polygons on the display. In some embodiments, method 100 can further include receiving a second instruction to draw the shape at the computing device. Then, after receiving the second instruction, the computing device can determine whether retessellation is to be performed for the shape based on one or more criteria for retessellation. Further, after determining that retessellation is not to be performed for the shape, the computing device can display the set of polygons on the display.

In some embodiments, the one or more criteria for retessellation can include one or more criteria selected from: a criterion based on a ratio between scale factors, a criterion based on a difference between scale factors, a criterion based on a size of the shape, and a criterion based on an indicator for anti-aliasing the shape.

In other embodiments, method 100 can further include receiving a third instruction to draw the shape at the computing device. Then, after receiving the third instruction, the computing device can determine whether retessellation is to be performed for the shape based on one or more criteria for retessellation, such as the one or more criteria for retessellation discussed immediately above. Further, after determining that retessellation is to be performed for the shape, the computing device can determine a second set of polygons that tessellate the shape, where the second set of polygons does not equal the set of polygons, and where the second set of polygons includes two or more polygons. Then, the computing device can display the second set of polygons on the display.

In even other embodiments, method 100 can additionally include determining an indicator for anti-aliasing. In these embodiments, determining the set of polygons that tessellate the shape can be further based on the indicator for anti-aliasing.

Example Shapes and Tessellations

Figure 2:
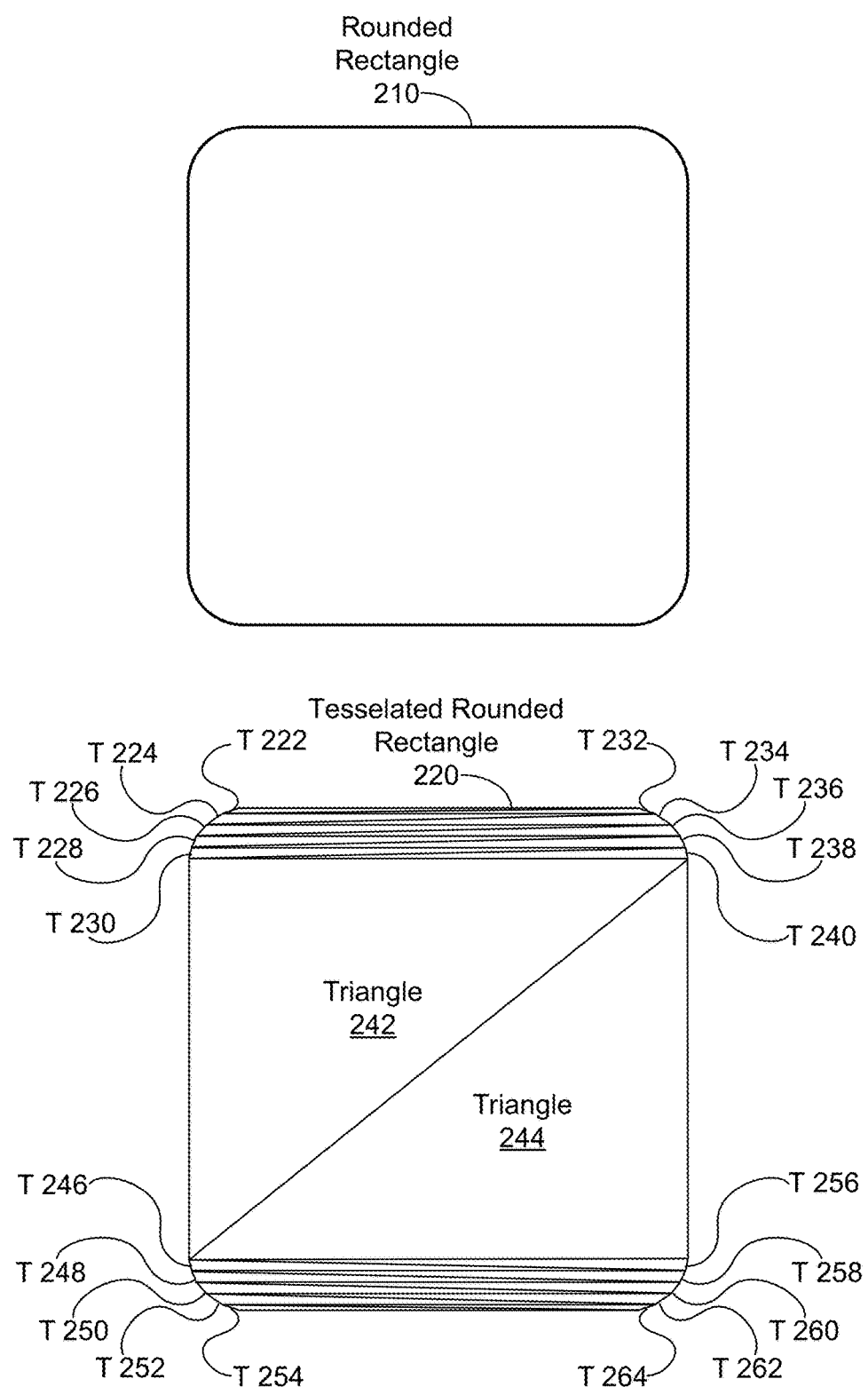
FIG. 2 is a diagram of a rounded rectangle and a tessellated rounded rectangle, in accordance with an example embodiment.

FIG. 2 is a diagram of rounded rectangle 210 and corresponding tessellated rounded rectangle 220, in accordance with an example embodiment. Rounded rectangle 210 is shown at the top of FIG. 2 as being approximately square with each of the four corners "rounded off" or replaced with arcs that connect sides of the rectangle.

Below rounded rectangle 210, FIG. 2 shows tessellated rounded rectangle 220, which is a tessellation of rounded rectangle 220 using N=22 polygons as tiles for tessellating the rounded rectangle. In the example shown in FIG. 2, the polygons used to tessellate rounded rectangle 220 are triangles (T's), labeled as triangles 222, 224, 226, 228, 230, 232, 234, 236, 238, 240, 242, 244, 246, 248, 250, 252, 254, 256, 258, 260, 262, 264. In other examples, more, fewer, and/or differently shaped triangles can be used to tessellate rounded rectangle 220; while in other examples, tiles with shapes other than triangles can be used to tessellate rounded rectangle; e.g., partial circles, such as quarter circles, and rectangles. In even other examples, other shapes than a rounded rectangle can be tessellated.

Rounded rectangle 210 can be drawn using 22 triangles 222-264 by setting color(s) for an interior of each of triangles 222-264 to corresponding color(s) of a respective portion of the interior of rounded rectangle 210 covered by the triangles. Also, colors of lines of each of triangles 222-264 that are interior to rounded rectangle 210 can be set to colors of the portions of the interior of rounded rectangle 210 covered by the interior lines of the triangle. In the example shown in FIG. 2, the interior of rounded rectangle 210 is white. So, to draw rounded rectangle 210 using the triangles of tessellated rounded rectangle 220, each of the interiors and interior lines of triangles 222-264 can be colored white. The border line of rounded rectangle 210 is shown in FIG. 2 as being black. Then, to draw rounded rectangle 210 using the triangles of tessellated rounded rectangle 220, each of line of triangles 222-264 forming part of the border of tessellated rounded rectangle 220 can be colored black. Other example colors, including examples with multiple colors, are possible as well.

Example Scenario for Drawing Tessellated Shapes

Figure 3A:
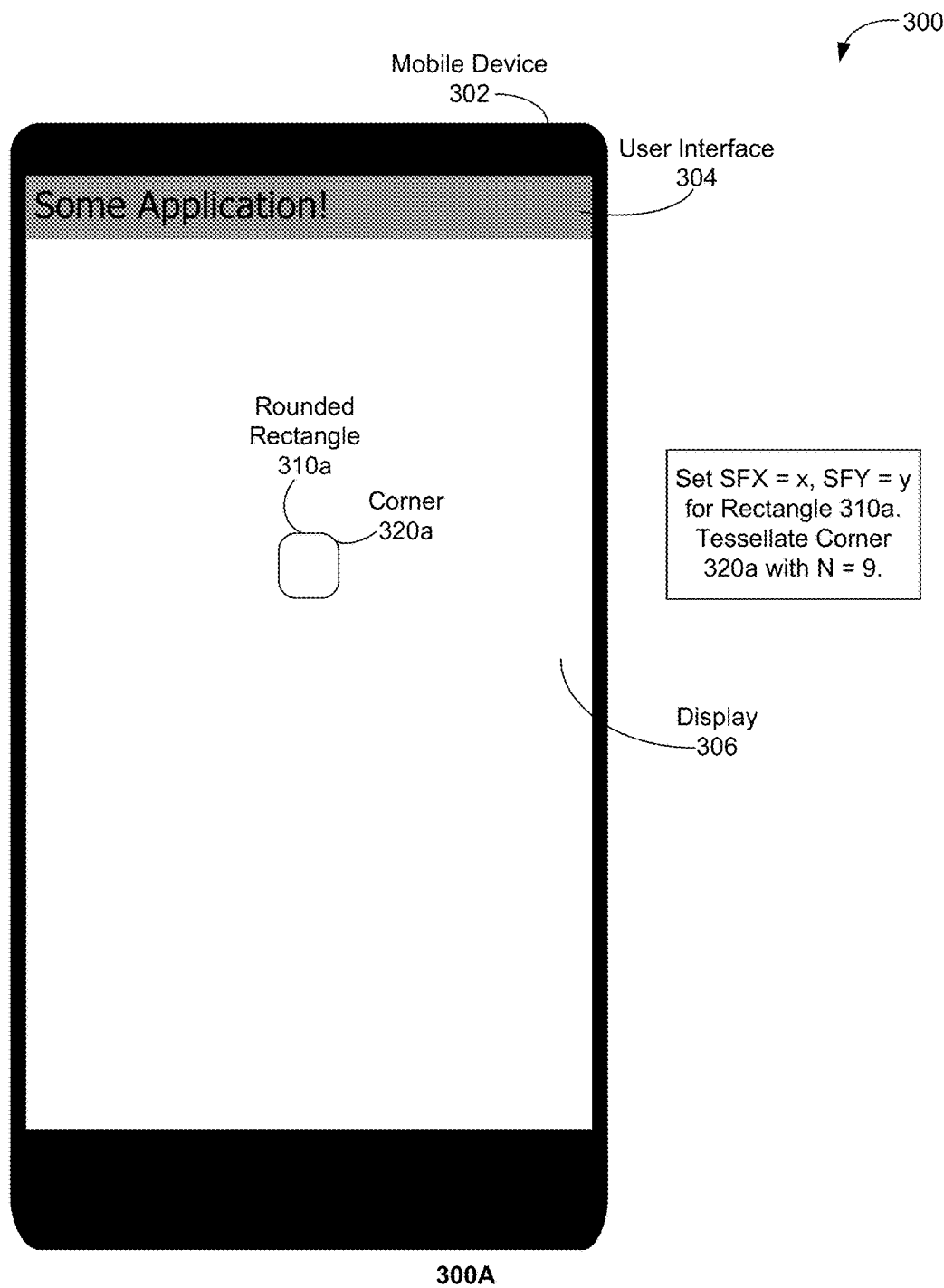
FIGS. 3A-3D depict a scenario for drawing shapes using a user interface, in accordance with an example embodiment.

FIGS. 3A-3D depict scenario 300 for drawing shapes on display 306 using user interface 304 of mobile device 302, in accordance with an example embodiment. Scenario 300 starts at 300A, shown in FIG. 3A, with mobile device 302 executing an application entitled "Some Application!" that utilizes user interface 304 and display 306 to draw rounded rectangle 310*a* having corner 320*a*. At 300A, scale factor SFX for rounded rectangle 310*a* in the X dimension is determined to be x, and scale factor SFY for rounded rectangle 310*a* in the Y dimension is determined to be y. Based on these scale factors SFX and SFY, mobile device 302 and/or user interface 304 can tessellate rounded rectangle 310*a*, including corner 320*a*, and then display tessellated rounded rectangle 310*a* using display 306. At 300A of scenario 300, corner 320*a* is tessellated with N=9 polygons, and rounded rectangle 310 is tessellated with N=46 polygons, specifically triangles, and is drawn on display 306 as shown in FIG. 3A.

For example, user interface 304 can draw a rounded rectangle with scale factors SFX and SFY by first generating a tessellated rounded rectangle with scale factors SFX and SFY and requesting a graphics processing component draw the tessellated rounded rectangle 310*a* at a location (x, y) on display 306 without showing interior lines of the tessellated rounded rectangle, such as discussed above in the context of FIG. 2.

In some scenarios, user interface 304 can animate rounded rectangle 310*a*. For example, user interface 304 can first draw rounded rectangle at (x, y) on display 306 without showing interior lines; drawing rounded rectangle 310*a* at (x1, y1) without showing interior lines, where (x1, y1)≠(x, y) on an inactive display; e.g., a display not currently visible, and swapping the inactive display with display 306.

After user interface 304 has swapped the inactive display with display 306, rounded rectangle 310*a* can appear to move from (x, y) to (x1, y1). For example, if x1=x+20, and y1=y, then rounded rectangle 310 can appear to have moved horizontally. As another example, if x1=x and y1=y+20, rounded rectangle can appear to have moved vertically. Many other movement examples are possible and other techniques for animating shapes, such as rounded rectangle 310*a* are possible as well.

Figure 3B:
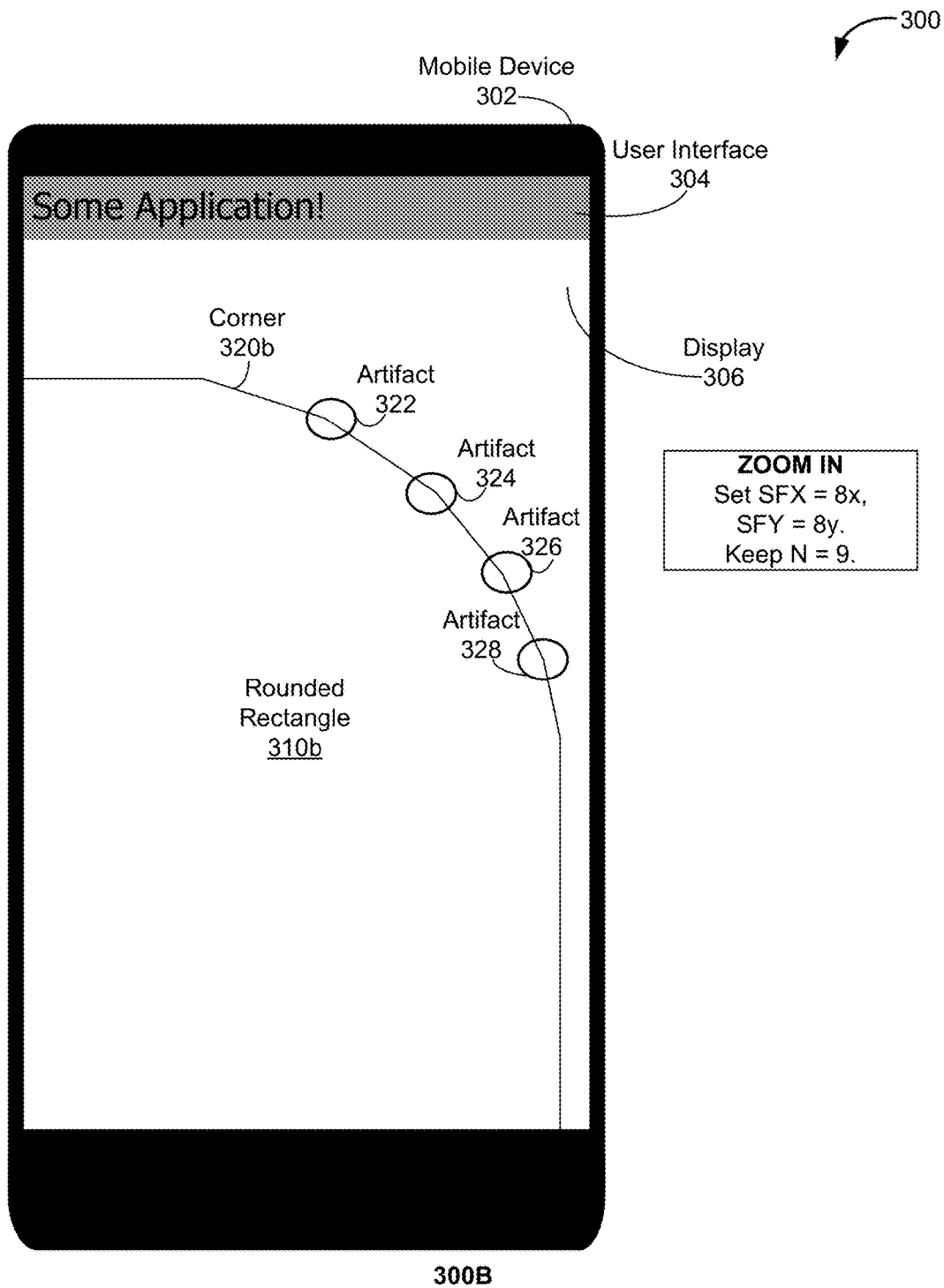

Scenario 300 continues at 300B, shown in FIG. 3B, after zooming in on rounded rectangle 310*a* to generate rounded rectangle 310*b* with rounded corner 320*b* corresponding to corner 320a. The zooming-in operation caused scale factors SFX and SFY to respectively be set to 8x and 8y, respectively. At 300b, the tessellation with N=9 triangles was used by mobile device 302 and user interface was used to draw corner 320b on display 306.

As shown in FIG. 3B, several artifacts 322, 324, 326, and 328 are visible in corner 320b. These artifacts can occur at points where two triangles come together and show a visible break from a curved line for corner 320b.

Scenario 300 continues with corner 320b being retessellated to use N=19 polygons. Retessellation can be determined based scale factors for corner 320b. For example, after a graphical operation on a shape S tessellated with N1 polygons, such as zooming, moving, rotating, or resizing an operation, new scale factor(s) can be determined for shape S and compared to previous scale factor(s) for shape S determined prior to the graphical operation. In some embodiments, the previous scale factor(s) for shape S can be scale factor(s) immediately prior to the graphical operation, while in other embodiments, the previous scale factor(s) for shape S can be scale factor(s) associated with shape S when shape S was most recently tessellated. Other choices of previous scale factors are possible as well, including but not limited to, average scale factors averaged over a number of previous operations, maximum scale factor(s) observed for shape S, and minimum scale factor(s) observed for shape S.

If the comparison indicates that that shape S should be retessellated, then shape S can be retessellated. After retessellation, a number N2 of polygons can be determined to have been used in the retessellation, where N2≠N1. In some embodiments, N2 with N2≠N1 can be determined prior to retessellation.

Several techniques can be used to compare scale factors. The comparison can involve determining ratios of scale factors; e.g., a ratio in X scale factors before and after the zooming-in operation of scenario 300 can be 8x/x=8. The comparison can involve taking differences between scale factors; e.g., in scenario 300, SFX prior to the zooming-in operation is x and SFX after the zooming-in operation is 8x. Then a difference in X scale factors before and after the zooming-in operation of scenario 300 can be 8x−x=7x. Ratios and differences of Y scale factors can be determined as well; e.g., the respective difference and ratio in Y scale factors before and after the zooming-in operation of scenario 300 are 7y and 8.

Combinations of X and Y scale factor differences can be used. For example, in this example, a ratio of the ratios X and Y scale factors after the graphical operation can be determined to indicate stretching in either the X or Y dimension; in the example of scenario 300, the ratio of X scale factor ratio to Y scale factor ratio after the zooming in operation is 8/8=1. The value of one indicates that the same amount of stretching was applied in the X dimension as in the Y dimension. In other examples, a ratio of X to Y scale factor ratios that is greater than one indicates more stretching the X dimension, while a ratio of X to Y scale factor ratios that is less than one indicates more stretching the in Y dimension. If retessellation is required for operations that involve more stretching in one dimension than other dimensions, then the retessellation can add more polygons to the most stretched dimension than the other dimensions.

Then, the compared values can be tested for retessellation. For example, a ratio of scale factors (or other comparison of scale factors) can be tested against two thresholds: an "increase polygons" threshold IPT and a "reduce polygons" threshold RPT. IPT can have a value; e.g., a value greater than one, to indicate that additional polygons are to be added during retessellation, and retessellation to add polygons can be performed when the ratio of scale factors is greater than IPT. For example, let IPT be three and let a comparison involving a ratio of X scale factors equal 1/4. Since the ratio of 1/4 is less than IPT, no retessellation to increase polygons is to be performed. As another example, let IPT remain three and let a comparison involving a ratio of X scale factors equal 8, such as in scenario 300. Then, since the ratio of 8 is greater than IPT, a retessellation to add polygons can be performed.

RPT can have a value; e.g., a value less than one, to indicate that polygons are to be removed during retessellation and retessellation to remove polygons can be performed when the ratio of scale factors (or other comparison of scale factors) is less than RPT. For example, let RPT be 1/3 and let a comparison involving a ratio of X scale factors equal 8, such as in scenario 300, then since the ratio of 8 is greater than RPT, no retessellation to reduce polygons to be performed. Rather, as indicated above, the IPT test would indicate a retessellation to increase polygons is to be performed. As another example, let RPT remain 1/3 and let the ratio of X scale factors equal 1/4. Then, as 1/4 is less than RPT, a retessellation to remove polygons can be performed.

In some cases, only RPT or IPT need be specified. For example if RPT is specified, IPT can be determined based on RPT, such as IPT=1/RPT or IPT=the integer portion of (1/RPT+0.25). If IPT is specified, RPT can be determined based on based on IPT, such as RPT=1/IPT or take the value of rounding (1.25/IPT) to 2 decimal places. Many other possible values of IPT and RPT are possible as well. In other cases, IPT and/or RPT can be specified for each dimension used by a shape. For example, for two-dimensional shapes, IPT and/or RPT can be specified for each of an X dimension and a Y dimension; e.g., IPTx, IPTy, RPTx, RPTy. Then, retessellation to increase polygons can be indicated if IPT is exceeded by the ratio in at least one dimension or when IPT is exceeded by the ratios of scale factors for all dimensions. Similarly, retessellation to decrease polygons can be indicated if RPT exceeds the ratio of scale factors in at least one dimension or when RPT exceeds the ratio of scale factors in all dimensions.

The differences in scale factors can be used in determining a number of polygons that can be used in retessellation. For example, let R=a ratio of a current scale factor and a previous scale factor and let IPT and RPT be defined as above. In this example, let R=8, as in scenario 300, IPT=3.5 and RPT=2/7. Then, as R exceeds IPT, a retessellation to increase polygons can be indicated. Then, let $N_{retess}$=round $(R/(ISV*/PI)*N_{current})$, where $N_{retess}$ is the number of polygons used in retessellation, ISV (IPT Scaling Value) is a value between 0 and 1, round(x) is a function that returns the rounded value of x, and $N_{current}$ is the number of polygons used in the current tessellation. For example, let ISV=5/7, and so ISV*IPT=2.5. The above function for $N_{retess}$ will likely increase the number of polygons in the retessellation over $N_{current}$ even when R is slightly larger than IPT, as the value R/(ISV*IPT)>1.4 for any value of R>3.5 with ISV=5/7 and IPT=3.5. Then, for the example of scenario 300, $N_{retess}$=round(8/2.5*9)=round(28.8)=29.

In another example, let R equal 1/8 and let IPT remain at 3.5 and RPT remain at 2/7. Then, as R is less than RPT, a retessellation to decrease polygons can be indicated. Then, let $N_{retess}$=round(max(($N_{current}*(R/(RSV*RPT))), 1))$ where max(x, y) returns the maximum of the two values x and y and RSV is a value greater than 1; e.g., RSV=1.4, and so RSV*RPT=1.4*2/7=0.4. The above use of max( ) in determining $N_{retess}$ indicates that $N_{retess}$ will be greater than or equal to 1. The above function for $N_{retess}$ will decrease the number of polygons in the retessellation compared to $N_{current}$ even when R is slightly smaller than IPT, as the value R/(RSV*RPT)<5/7, for R<2/7, RSV=1.4 and RPT=2/7. Then, for the example of scenario 300, $N_{retess}$=round (max(9*(1/8/(0.4))), 1))=round(max (2.8125, 1))=round (2.8125)=3.

Many other techniques for using scale factors for determining when retessellation is needed and/or for using scale factors to determine a number of polygons to be used for retessellation are possible as well.

Figure 3C:
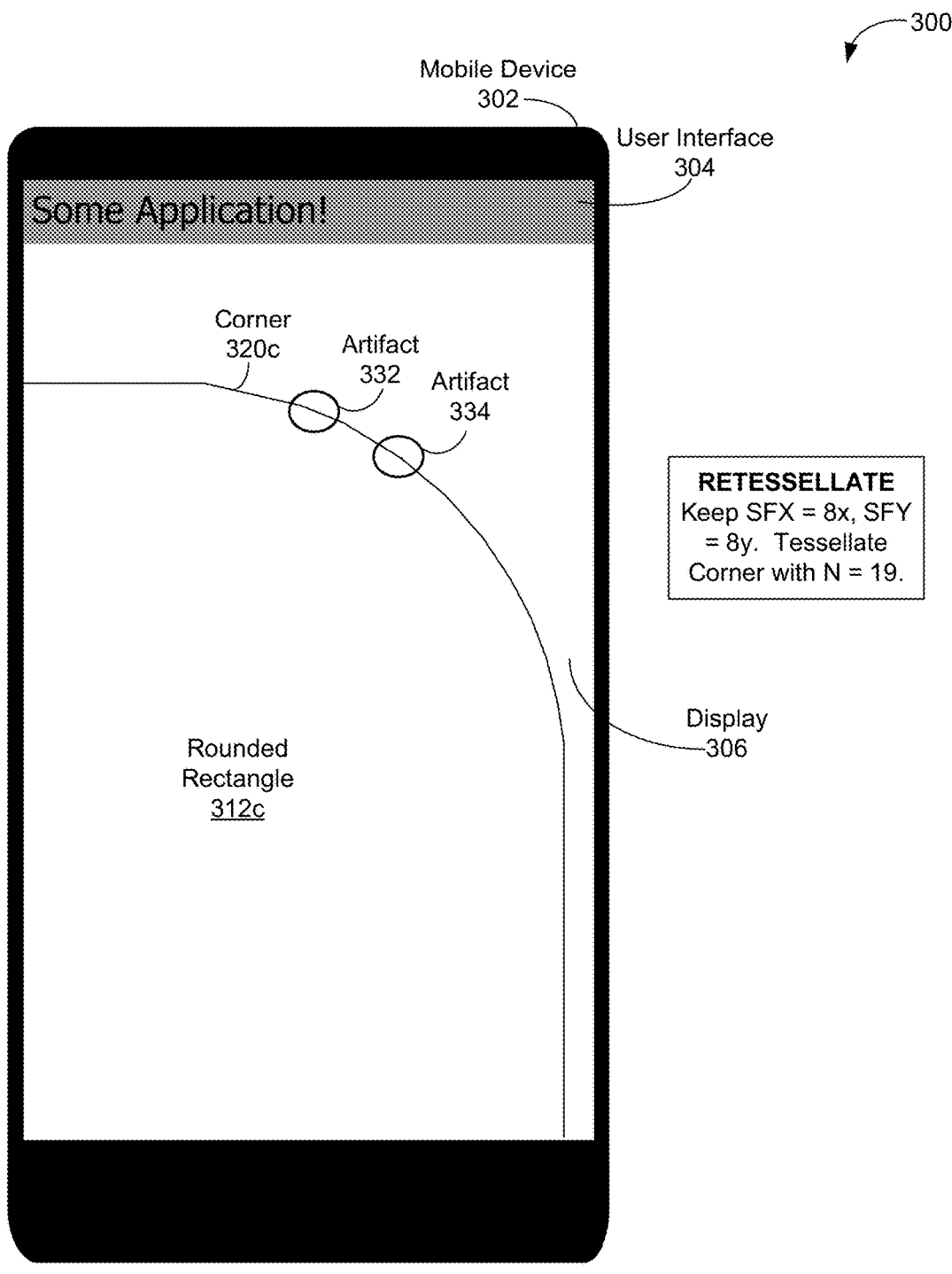

Scenario 300 continues at 300C, shown on FIG. 3C, with rounded corner 320c after retessellation with N=19 polygons and with scale factors SFX and SFY having values of 8x and 8y, respectively. After retessellation, some artifacts are still visible, such as artifacts 332 and 334, but these artifacts are not as visually distracting or as numerous as prior to tessellation. Thus, increasing the number of polygons used in tessellating and subsequently drawing a shape after increasing the scale factor(s) for the shape can improve a visual representation of the shape, including reducing, or in some cases, eliminating visible artifacts and/or reducing the visual distraction of the artifact.

Figure 3D:
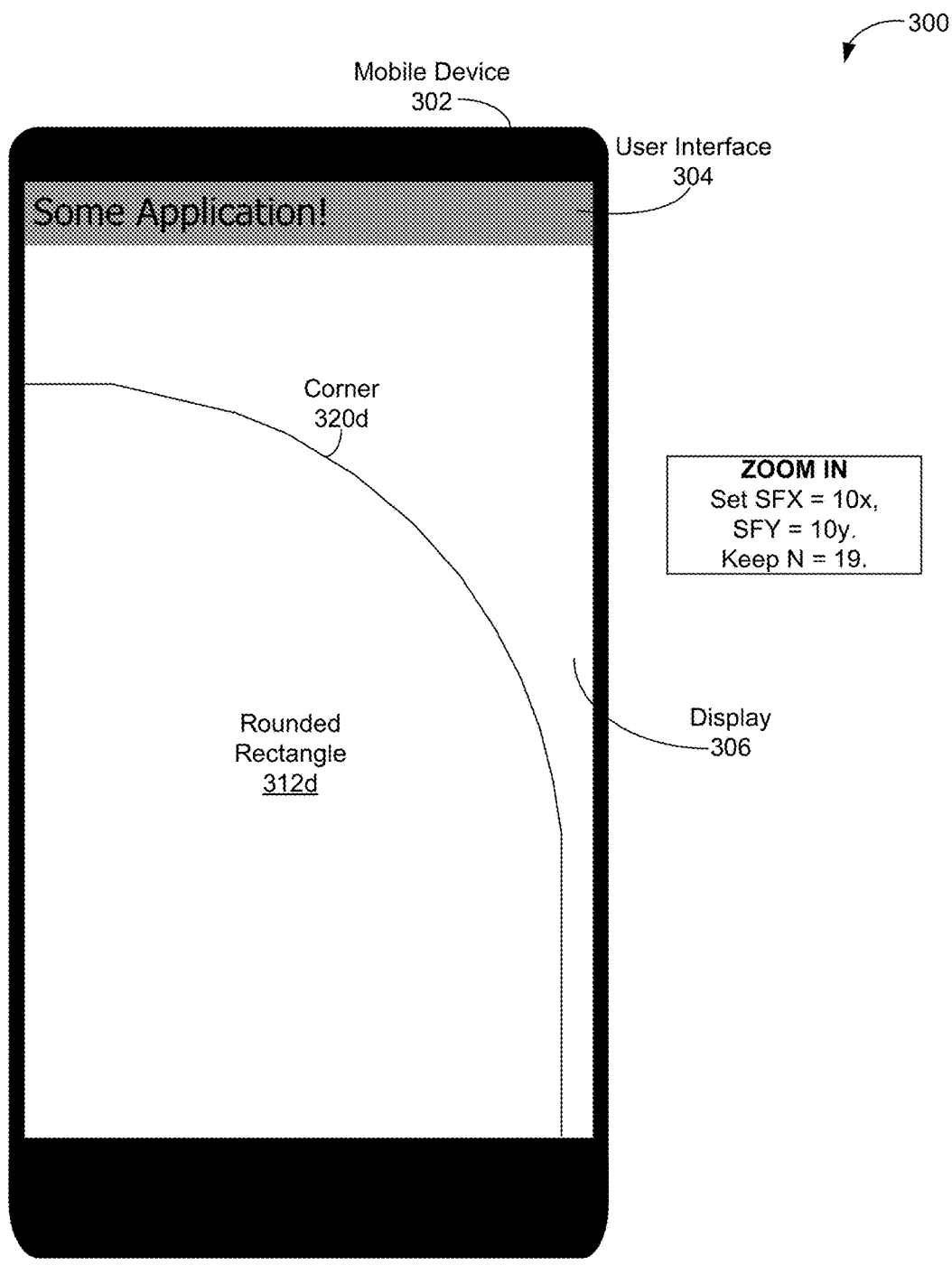

Scenario 300 continues at 300D, shown on FIG. 3D, with rounded corner 320d tessellated with N=19 polygons and with scale factors SFX and SFY having been increased from previous respective values of 8x and 8y at 300C to respective values 10x and 10y. A ratio R of 1.25 can be determined between the current X scale factor, which is 10x, and either the previous X scale factor or the X scale factor associated with the tessellation used to draw corner 320d, both of which are 8x. Also, a ratio R of the current Y scale factor and either the previous Y scale factor or the Y scale factor associated with the tessellation used to draw corner 320d is 1.25. Using the above mentioned values of IPT=3.5 and RPT=2/7, an R value of 1.25 is less than IPT, so no retessellation to increase polygons is indicated. Also, as R is greater than RPT, no retessellation to decrease polygons is indicated. Thus, the tessellation with N=19 polygons is used to draw 320d at 300D. After 300D, scenario 300 can be completed.

Figure 4A:
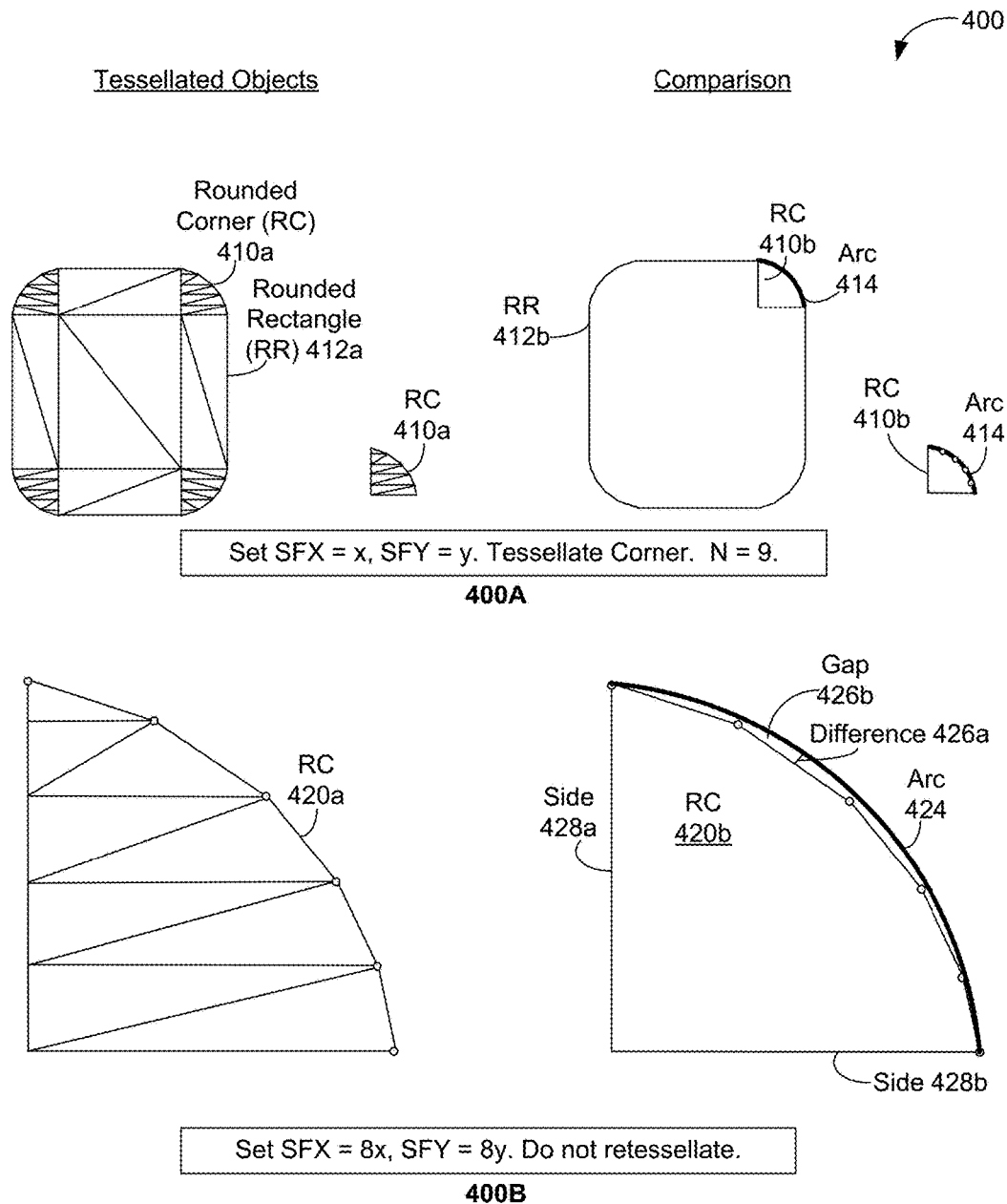
FIGS. 4A and 4B show tessellated objects and comparable polygons related to the scenario shown in FIGS. 3A-3D, in accordance with an example embodiment.
Figure 4B:
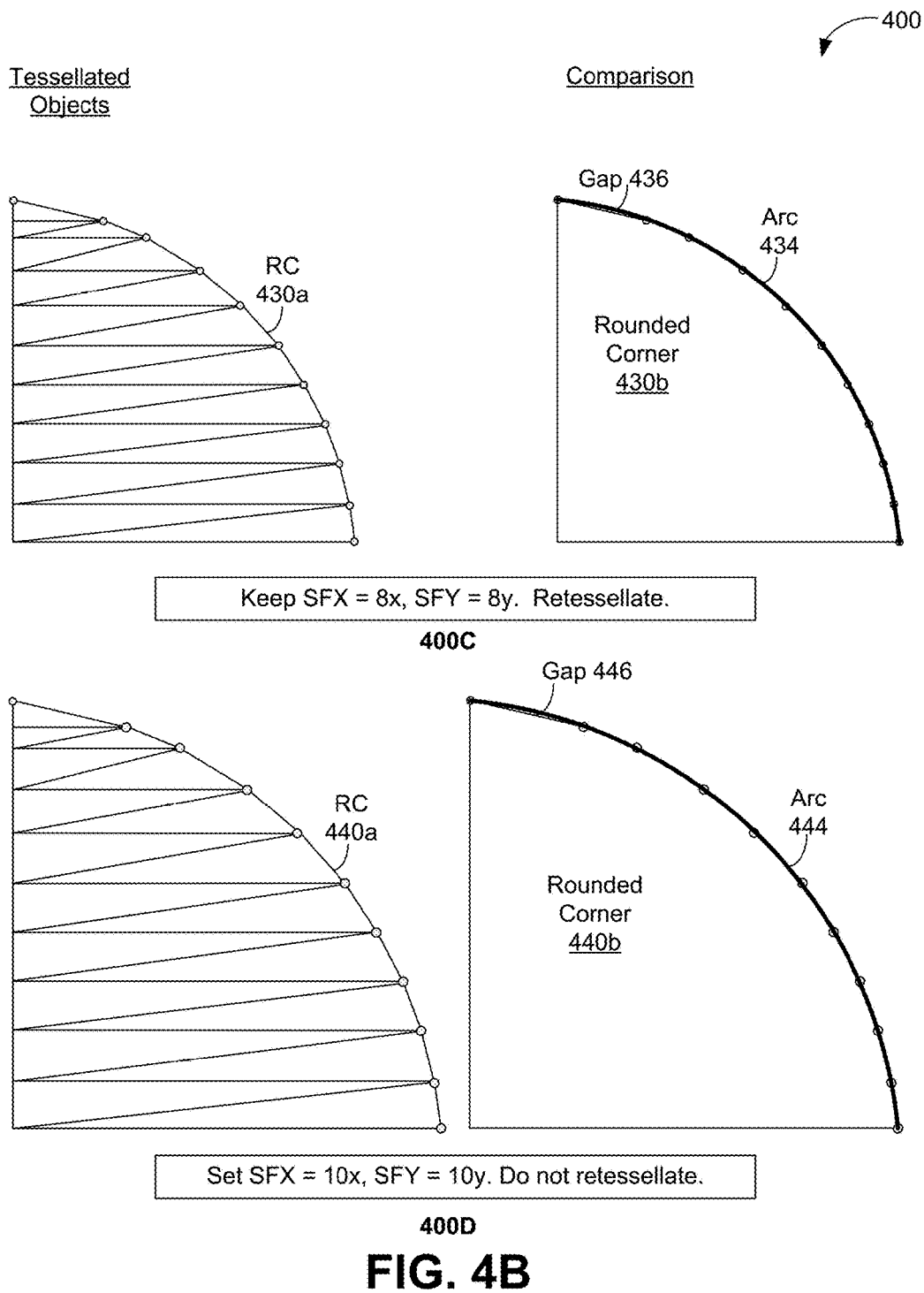

FIGS. 4A and 4B show tessellated objects and comparable polygons related to scenario 300, in accordance with an example embodiment. FIGS. 4A and 4B are each divided into two columns: a left column of "Tessellated Objects" discussed above for context 320, and a "Comparison" column showing of tessellated objects compared with an idealized object; e.g., arcs for rounded corners. In some embodiments and scenarios, a tessellated object can be compared to a corresponding idealized object to determine whether retessellation is required.

At 400A of FIG. 4A, as at 300A of scenario 300 shown in FIG. 3A, a rounded rectangle (RR) 410a is shown with scale factors SFX=x, SFY=y, and a number of polygons N used to tessellate rounded corner 410a set to 9. Rounded corner 410a shows that each of the nine polygons is a triangle. The number NRR of polygons used to tessellate rounded rectangle 412a is 46: nine for each of the four rounded corners of rounded rectangle 412a, and ten for the remainder of rounded rectangle 412a.

The tessellated version of rounded rectangle 412a can illustrate how intrinsic complexity of an object can be part of the determination of a number of polygons needed to tessellate an object: each corner of rounded rectangle 412a has 9 polygons, as the complexity of modeling a curve using polygons (e.g., the triangles shown at 400A of FIG. 4A) is higher than the complexity of modeling a straight line using polygons; e.g., modeling a straight line connecting two rounded corners of rounded rectangle 412a.

On the right side of FIG. 4A depicting 400A, an image of rounded rectangle 412b as rendered in scenario 300 is shown with two interior lines to clarify a location of rounded corner 410b. Rounded rectangle 412b and rounded corner 410b are each drawn using the respective tessellation shown for rounded rectangle 412a and rounded corner 410a.

Arc 414 is shown along a curved portion of rounded corner 410b to provide a comparison between an idealized form of a curve; that is, arc 414, and an approximation of the curve provided by a tessellation; that is, rounded corner 410a, 410b. FIG. 4A at 400A shows that arc 414 is very close to rounded corner 410b, and so the approximation provided by rounded corner 410b is at least good enough that retessellation of rounded corner 410b is likely not necessary when scale factor SFX=x and scale factor SFY=y.

At 400B of FIG. 4A, scale factor SFX is set to 8x and scale factor SFX is set to 8y, as at 300B of FIG. 3B. On the left side of FIG. 4A at 400B, rounded corner 420a, which is rounded corner 410a after scaling with scale factor SFX=8x and scale factor SFY=8y. For clarity's sake, small dots have been added to rounded corner 420a where the vertices of triangles of rounded corner 420a touch an approximate curve outlining rounded corner 420a.

On the right side of FIG. 4B at 400B, rounded corner 420b is compared with arc 424, with arc 424 acting as an idealized object. Difference 426a illustrates a difference between rounded corner 420b and arc 424. By determining differences between rounded corner 420b and arc 424 along the length of arc 426, a maximum difference $D_{max}$ can be calculated. The maximum difference $D_{max}$ can be compared to a threshold value. If $D_{max}$ exceeds the threshold value, then rounded corner 420b can be considered to be an incorrect approximation of arc 424, and so retessellation is indicated. The threshold value can vary depending on application; e.g., a GUI application can have a different threshold than a computer-aided design application.

In other embodiments, a gap 426b between a line segment of rounded corner 420b and arc 424 can be determined. and art An amount of area in gap 426b can be calculated by determining an area $A_{ideal}$ of the portion of a circle (or ellipse) swept out by arc 426 from side 428a to side 428b (or vice versa). Similarly, an area $A_{tess}$ can be determined by summing the areas of each of the N polygons used to tessellate rounded corner 420b. Then, an amount of an area $A_{gap}$ can be determined as $A_{gap}=|A_{ideal}-A_{tess}|$. The area $A_{gap}$ can be compared to a threshold value and, if $A_{gap}$ exceeds the threshold value, then rounded corner 420b c can be considered to be an incorrect approximation of arc 424, and so retessellation is indicated. A similar comparison can be made using ratios; e.g., one or more of $A_{tess}/A_{ideal}$, $A_{ideal}/A_{tess}$, $A_{gap}/A_{ideal}$, and $A_{gap}/A_{tess}$. The ratio(s) can be compared to suitable threshold values to determine whether retessellation is indicated; e.g., if $A_{gap}/A_{ideal}>5\%$, then retessellation is indicated. In other examples, a threshold value other than 5% can be used; e.g., 0.5%, 1%, 12%, etc. The threshold value can vary depending on application; e.g., a GUI application can have a different threshold than a computer-aided design application.

At 400C of FIG. 4B, scale factor SFX is set to 8x and scale factor SFX is set to 8y and rounded corner 430a has been retessellated to use N=19 triangles as polygons, as at 300C of FIG. 3C. On the left side of FIG. 4B at 400C, rounded corner 430a depicts the N=19 triangles used to retessellate the rounded corner after scale factor SFX was set to 8x and scale factor SFY was set to 8y. For clarity's sake, small dots have been added to rounded corner 430a where the vertices of triangles of rounded corner 430a touch an approximate curve outlining rounded corner 430a.

On the right side of FIG. 4B at 400C, rounded corner 430b is compared with arc 434, and gap 436 is determined. FIG. 4B illustrates that gap 436 is smaller than gap 426, indicated that retessellation with 19 triangles has improved the approximation of arc 434 made by rounded corner 430b compared to the approximation of arc 424 made by rounded corner 420b.

At 400D of FIG. 4B, scale factor SFX is set to 10x and scale factor SFX is set to 10y and rounded corner 440a has been tessellated to use N=19 triangles as polygons, as at 300D of FIG. 3D. On the left side of FIG. 4B at 400D, rounded corner 440a depicts the N=19 triangles used to retessellate the rounded corner after scale factor SFX was set to 10x and scale factor SFY was set to 10y. For clarity's sake, small dots have been added to rounded corner 440a where the vertices of triangles of rounded corner 440a touch an approximate curve outlining rounded corner 440a.

On the right side of FIG. 4B at 440D, rounded corner 440b is compared with arc 444, and gap 446 is determined. FIG. 4B illustrates that gap 446 at 440D is larger than gap 436 at 400C, particularly between the topmost two vertices of rounded corner 440b and arc 444. The apparent smallness of gap 446 indicates that tessellation with 19 triangles is visually close to arc 444, even after both X and Y scale factors have increased by 125%—respectively from 8x to 10x and from 8y to 10y. Therefore, retessellation is not indicated for rounded corner 440b.

In a different scenario where scenario 400 runs in reverse; i.e., from 400D to 400A, gap 414 determined after both X and Y scale factors are decreased by 800% at 400B can be compared to another threshold to determine if too many polygons are used in the tessellation of the rounded corner. A value based on gap 414 can be compared to a minimum threshold value (e.g., a value between 0.001% and 1%) and, if the value is smaller than the minimum threshold, the rounded corner can be retessellated with fewer polygons. For example, let $R=A_{gap}/A_{ideal}$ be determined for gap 414 with rounded corner 410b being tessellated with 19 triangles, as would be the case if scenario 400 started at 400D. Then, if R<the minimum threshold value, retessellation of rounded corner 410b with fewer polygons can be indicated; e.g., N can be reduced from 19 to 9. Many other examples and scenarios are possible as well.

Example Tessellated Anti-Aliased Objects and Polygons

Figure 5A:
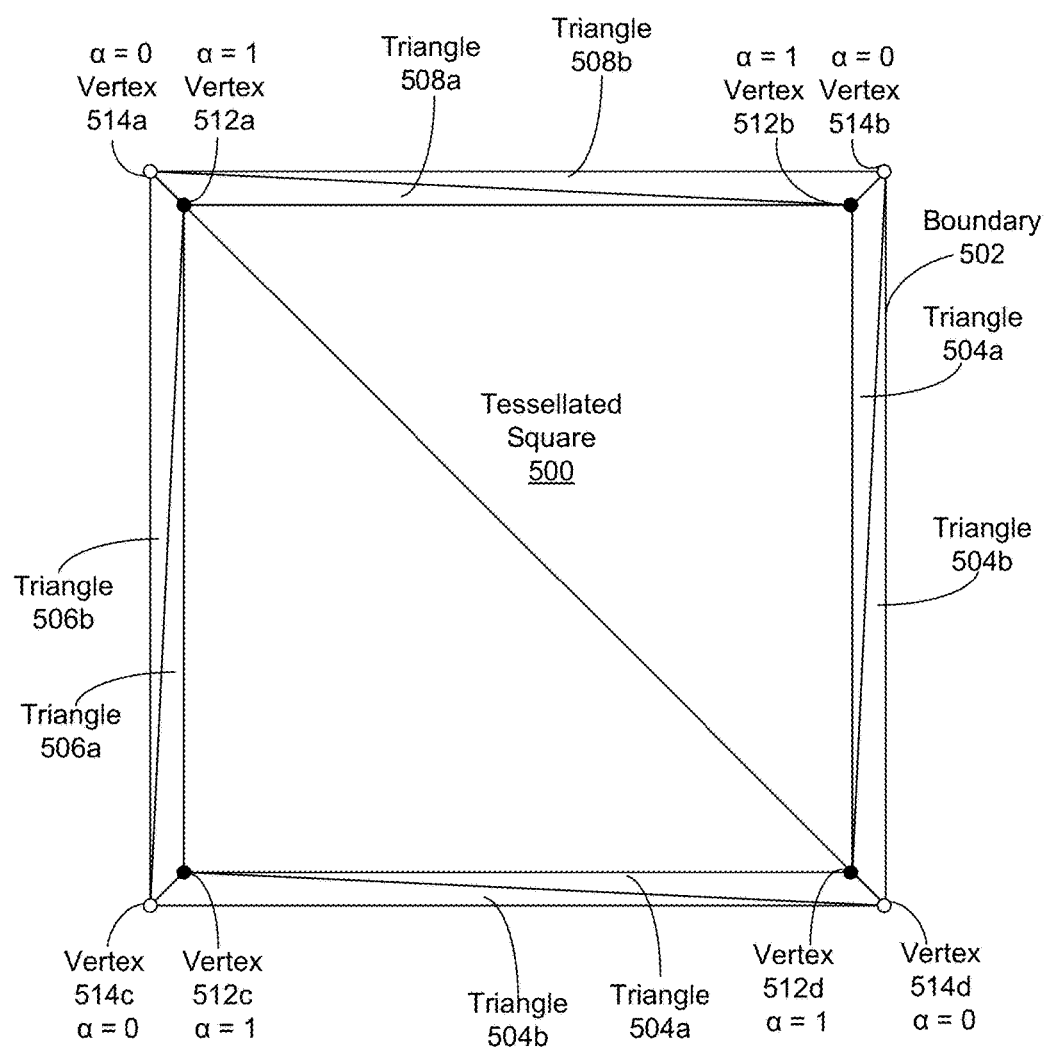
FIG. 5A illustrates an example shape with an anti-aliasing boundary, in accordance with an example embodiment.
Figure 5B:
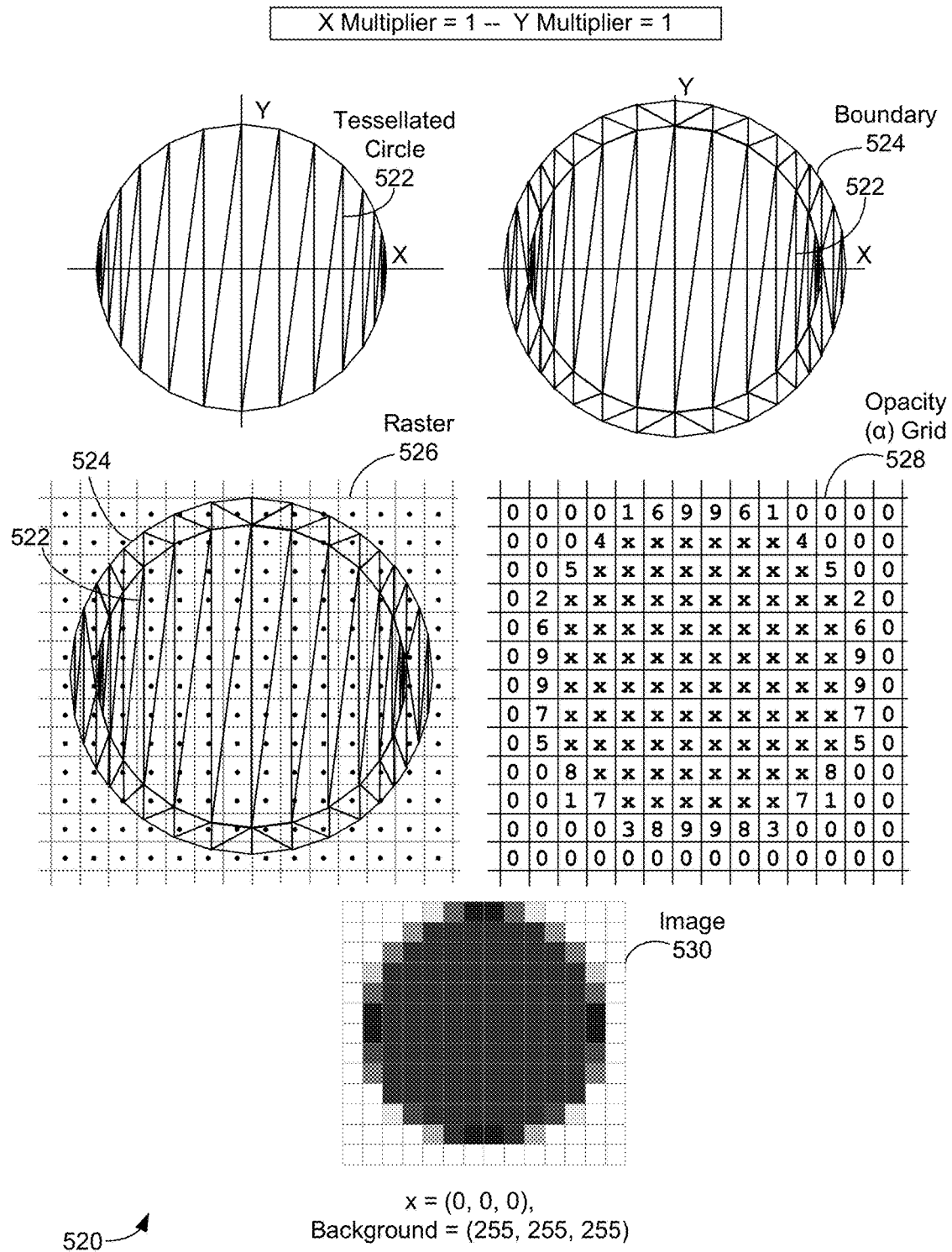
FIG. 5B depicts an example scenario for rendering a shape, in accordance with an example embodiment.
Figure 5C:
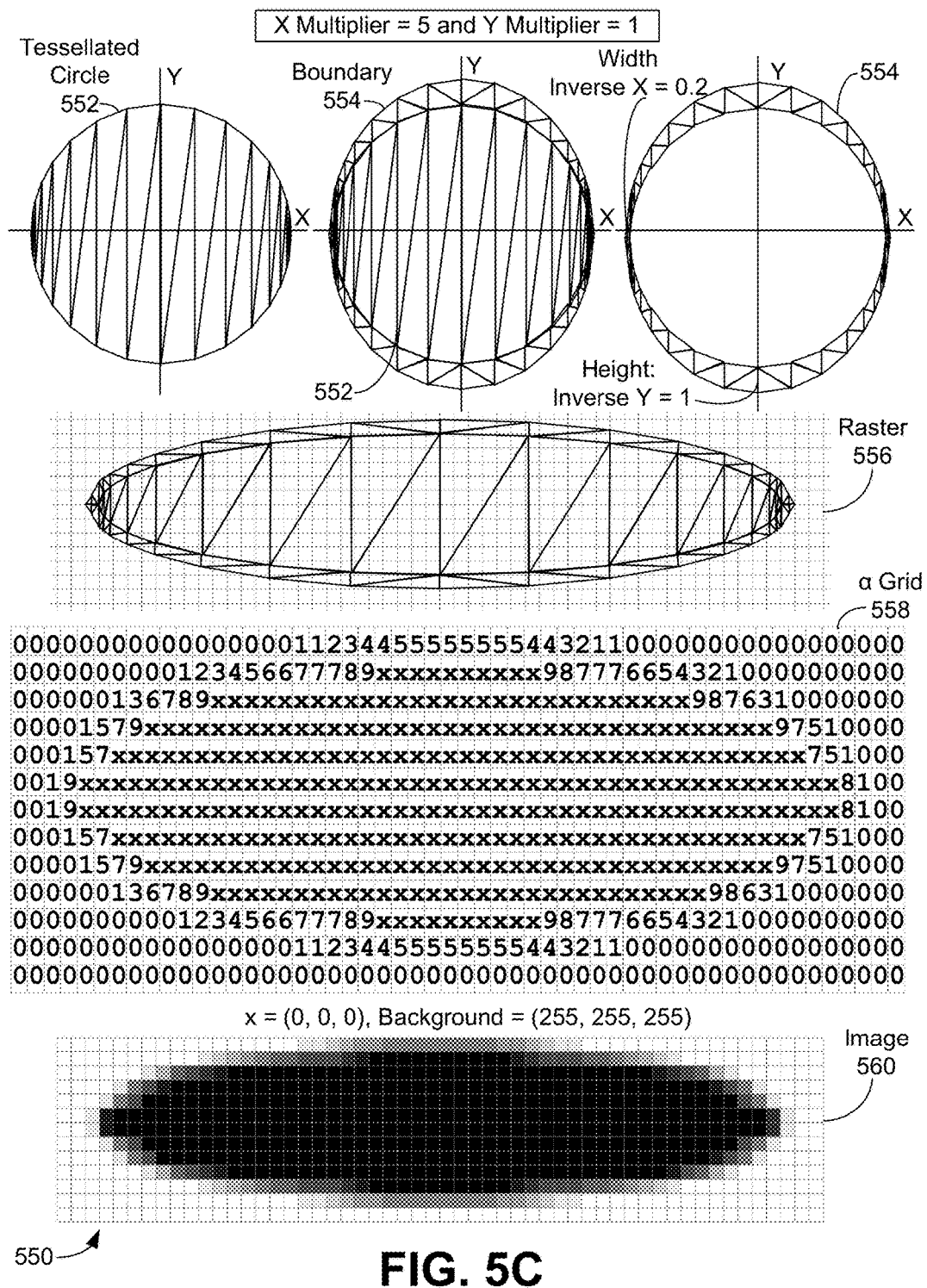
FIG. 5C depicts another example scenario for rendering a shape, in accordance with an example embodiment.

FIGS. 5A, 5B, and 5C each show tessellated objects with anti-aliasing boundaries, in accordance with an example embodiment. One technique to anti-alias a shape, such as the tessellated shapes discussed above, is to add a boundary region to the shape of a known size to the shape; e.g., a one-pixel wide boundary. Each vertex on an outside edge of the shape can be given an opacity value α of 1 and each vertex on an outside edge of the boundary can be given an opacity value of 0.

The opacity for each pixel whose pixel center is in the interior of the shape can be set to 1, and the opacity for each pixel whose pixel center is outside of the boundary can be set to 0. For the remaining pixels; that is, those whose pixel centers are outside the shape and inside the boundary, the opacity of the pixel can be set to D (or a value based on D), where D is a distance from the pixel center to the outside edge of the boundary.

For many GPU's, this calculation is straightforward, involving a single variable with a single multiplication operation in a fragment shader of a rendering pipeline. Such a simple fragment shader can be efficiently utilized with devices not configured to utilize complex shaders for large portions of fragments. Further, this technique handles arbitrary geometries and does not rely upon hardware and/or software specifically configured for anti-aliasing shapes.

As an illustration, FIG. 5A shows square 500 tessellated using two triangles and bordered by a boundary 502 having eight triangles 504a, 504b, 506a, 506b, 508a, 508b, 510a, and 510b. Each vertex on an outside edge of square 500; e.g., vertices 512a, 512b, 512c, and 512d has been assigned an opacity (α) value of 1 and each vertex on an outside edge of boundary 502; e.g., vertices 514a, 514b, 514c, and 514d has been assigned an opacity (α) value of 1.

FIG. 5B depicts scenario 520 for rendering tessellated circle 522, in accordance with an example embodiment. In scenario 520, an X multiplier and a Y multiplier are both set equal to 1. The X (or Y) multiplier can be the above-mentioned X (or Y) scale factor. In some embodiments, the X (or Y) multiplier can be based on the above-mentioned X (or Y) scale factor, such as, but not limited to being: a multiple of the X (or Y) scale factor, a reciprocal of the X (or Y) scale factor, or have a functional relationship with the X (or Y) scale factor; e.g., the X multiplier can be equal f(X scale factor) for some function f( ).

In scenario 520, tessellated circle 522 is rendered with anti-aliasing using a boundary, such as discussed above. Tessellated circle 522 can first drawn with reference to a geometric space, such as a 2-dimensional plane often represented using X and Y axes, or a 3-dimensional volume often represented using X, Y, and Z axes. At the upper left-hand side, FIG. 5B depicts tessellated circle 522 drawn in an XY plane with X and Y axes. The geometric space can be bounded; e.g., the portion of the XY plane within a bounding box whose lower-left-hand corner coordinates are (−2, −2) and whose upper-right-hand corner coordinates are (+2, +2). The upper right-hand side of FIG. 5B depicts tessellated circle 522 drawn in an XY plane with X and Y axes with boundary 524 for anti-aliasing.

The geometric space can be mapped to a screen space, such as but not limited to a display, frame buffer, or raster. Frame buffers and rasters can be grids of pixels that can represent a display of a computing device. The mapping can be performed by using a transformation matrix TM to map a coordinate C(g) to a corresponding coordinate C(s) in screen space; e.g., C(s)=TM*C(g). The transformation matrix can be used to perform one or more transformations on the C(g) coordinate; these transformations can include, but are not limited to operations of scaling, translating, skewing/shearing, rotating, reflecting, and/or projecting the C(g) coordinate into the screen space as C(s). In some embodiments, only one of the above-mentioned operations are performed; e.g., TM is configured to perform only translate C(g) to C(s); TM is configured to scale C(g) to generate C(s). In other embodiments, the scale factors can be based on elements of the transformation matrix involved in scaling and/or skewing the C(g) values; e.g., the values along a diagonal of TM. In still other embodiments, TM can be a square matrix, such as a 2×2, 3×3, or a 4×4 matrix.

The X and Y multipliers can be used as scale factors. For example, let the X multiplier=2 and the Y multiplier=1 and the geometric space be the portion of the XY plane within a bounding box whose lower-left-hand corner coordinates are (−2,−2) and whose upper-right-hand corner coordinates are (+2,+2). Then, all X coordinates in the bounding box can be multiplied by the X multiplier and all Y coordinates in the bounding box can be multiplied by the Y multiplier. In this example, the resulting bounding box would have lower-lefthand corner coordinates of (−4,−2) and upper-right-hand corner coordinates of (+4, +2).

An example transformation matrix TM1 to perform the above-mentioned scaling can be:

$$TM1 = \begin{bmatrix} 2 & 0 \\ 0 & 1 \end{bmatrix}$$

Other transformation matrices than TM1 are possible that also scale geometric-space coordinates to screen-space coordinates as indicated in this example.

For example if $C1(g)=(0.5, 0.5)^T$, then $C1(s)=TM1*C1(g)=(1, 0.5)^T$. To continue the example above, let $C2(g)$ be the lower-left hand corner coordinate of the geometric space=$(-2, -2)^T$, then $C2(s)=TM1*C2(g)=(-4, -2)$, and so $C2(s)$ is the corresponding lower-left hand corner coordinate of the screen space. Many other examples are possible as well.

In scenario 520, the X multiplier=1 and the Y multiplier=1, i.e., a transformation matrix for this scenario can translate and perhaps other transformations of coordinates in the geometric space to corresponding coordinates in a screen space represented in FIG. 5B as raster 526. As the X and Y multipliers are 1, the X and Y coordinates are not indicated to be scaled, and so any transformation performed by the transformation matrix may occur without scaling.

After a shape, such as circle 522, and an anti-aliasing boundary are tessellated in the geometric space, the scaled shape and anti-aliasing boundary can be drawn into a raster, such as raster 526. The raster can be rendered and perhaps displayed by the computing device. In scenario 520, the geometric space is the XY plane and the raster includes at least a 14×13 grid of pixels.

The center-left image of FIG. 5B shows circle 522 and boundary 524 drawn in raster 526. Raster 526 is shown in FIG. 5B as a 14×13 grid of pixels with grey grid lines and a black dot at each pixel center. In scenario 520, opacity values for each pixel in raster 526 can be determined as mentioned above. First, the opacity for each pixel whose pixel center is in the interior of the shape can be set to a maximum opacity value (e.g., 1, 10, 100) and the opacity for each pixel whose pixel center is outside of the boundary can be set to a minimum opacity value (e.g., 0 or 1).

An intuitive approach to set the opacity for the remaining pixels is to set the opacity of the pixel can be set to D (or a value based on D), where D is a distance from the pixel center to the outside edge of the boundary. A pixel unit is the size of a pixel. For the example of square pixels, such as shown for raster 526 in FIG. 5B, one pixel unit equals the width or height of a pixel. In scenario 520, D is determined in tenths of pixel units; e.g., a D value of 3 for a particular pixel P indicates that the pixel center of P is approximately ³⁄₁₀ths of a pixel unit from the outside edge of boundary 524.

In some embodiments, opacity can be determined as follows: a pixel can be considered as a drawn pixel if a center of the pixel falls within a (tile of a) shape; e.g., circle 522 or boundary 524. A not-drawn pixel can be assigned to a minimum opacity value. In some cases, not-drawn pixels can also be assigned to background color—for example, in image 530 of FIG. 5B, not-drawn pixels are assigned to the background color of (255, 255, 255), which is a color of white.

If the pixel center of a drawn pixel falls within a tile of the shape to be rendered; e.g., one of the triangles of tessellated circle 522 of FIG. 5B, then opacity for the drawn pixel can be assigned to the maximum opacity value. If the pixel center of a drawn pixel is within a tile of the boundary; e.g., one of the triangles of boundary 524 of FIG. 5B, then opacity can be assigned based on an averaged distance between the pixel center of the drawn pixel and vertices of nearby triangles. The averaged distance can be a weighted average that is scaled between the minimum opacity value and the maximum opacity value; e.g., the range of 0 to 1, 0 to 10, 0 to 255, 1 to 10, or some other range between minimum and maximum opacity values where the maximum opacity value is greater than the minimum opacity value.

In scenario 520, the D values mentioned above are used as opacity values, for a range of opacity values between a minimum opacity value of 0 and a maximum opacity value of 10. Opacity grid 528, shown at center-right of FIG. 5B, indicates opacity values for each pixel in raster 526. In some embodiments, opacity grid 528 need not be explicitly formed; i.e., opacity values can be calculated and used without storing them into opacity grid 528.

Opacity grid 528 uses the minimum opacity value of 0 for non-drawn pixels assigned to the minimum opacity value of 0 (i.e., non-drawn pixels have no opacity or can be considered as fully transparent), a value of "x" for a drawn pixel whose center in the interior of circle 522, which corresponds to the maximum opacity value of 10, and values between 1 and 9 for values whose pixel centers are within boundary 524. For example, the top row of opacity grid 528 shows values of 0, 0, 0, 0, 1, 6, 9, 9, 6, 1, 0, 0, 0, 0 where the 0-valued not-drawn pixels are transparent. The 1-valued drawn pixels are very slightly opaque, and so are colored mostly by the background with a small amount of color from the shape The 6-valued drawn pixels are slightly more opaque than transparent and so take on a color slightly more of the shape than of the background. Additionally, the 9-valued drawn pixels are nearly opaque and take on almost all of the color of the shape.

The bottom of FIG. 5B shows an example image 530, with grid lines having color (128, 128, 128) added for clarity. Image 530 depicts a black circle on a white background. Using the red-green-blue (RGB) color model with one-byte color representations, the background has color (0, 0, 0) and the circle has color (255, 255, 255). Grid lines are also shown in image 530, each grid line having color (128, 128, 128). With respect to opacity value grid 528, "X" values have maximum opacity and take on the color of the circle=(0, 0, 0) in image 530, "0" values have minimum opacity (are transparent) and take on the color of the background=(255, 255, 255) in image 530, and values between "1" and "9" take on part of the color of the circle and part of the color of the background based on the specific opacity value, as discussed above. After rendering image 530, scenario 520 can be completed.

FIG. 5C depicts scenario 550 for rendering tessellated circle 552, in accordance with an example embodiment. In scenario 550, the Y multiplier is set to 1 as in scenario 520, but the X multiplier has been set to 5. An example transformation matrix TM2 to scale geometric coordinates as indicated by the X and Y multipliers can be:

$$TM2 = \begin{bmatrix} 1 & 0 \\ 0 & 5 \end{bmatrix}$$

Other transformation matrices than TM2 are possible that also scale geometric-space coordinates to screen-space coordinates as indicated by the X and Y multipliers.

The upper-left portion of FIG. 5C shows un-scaled tessellated circle 552 in a geometrical space represented by the XY plane. In other embodiments, tessellated circle 552 can be drawn in the geometrical space with scaling based on the X and Y multipliers.

In scenario 550, tessellated circle 552 is rendered with anti-aliasing using a boundary, such as discussed above. The upper-center portion of FIG. 5C depicts tessellated circle 552 drawn in an XY plane with X and Y axes with boundary 554 for anti-aliasing and the upper-right portion of FIG. 5C depicts boundary 554 alone. In both the upper-center and upper-right portions of FIG. 5C, boundary 554 is shown drawn in the geometrical space with scaling based on the X and Y multipliers.

To maintain a uniform boundary size when rendered, an anti-aliasing boundary, such as boundary 554, can be inversely scaled with the respect to the scaling performed on a shape, such as circle 552. That is, an inverse X multiplier; e.g., a reciprocal of the X multiplier for the shape can be used as a X multiplier for scaling the anti-aliasing boundary in the geometrical space and an inverse Y multiplier for the shape can be used as an Y multiplier for the anti-aliasing boundary scaling the anti-aliasing boundary in the geometrical space.

Then, scaling the boundary in the X (width) dimension by the X multiplier prior to rendering will lead to a Boundary_Scale_X value, or net scale in the X dimension for the anti-aliasing boundary, of Boundary_Scale_X=inverse X multiplier (applied in geometrical space)*X multiplier (applied prior to rendering). Scaling the boundary in the Y (height) dimension by the Y multiplier prior to rendering will lead to a Boundary_Scale_Y value, or net scale in the Y dimension for the anti-aliasing boundary, of Boundary_Scale_Y=inverse Y multiplier (applied in geometrical space)*Y multiplier (applied prior to rendering). Thus, the net effect in both the X and Y dimensions to have a corresponding Boundary_Scale value of 1, assuming both the X and Y multipliers are non-zero. Then, an effective size of the boundary as rendered in screen space is 1 pixel in each dimension.

In other embodiments, boundary scaling can be performed to have a boundary with an effective size other than 1 pixel. Generally speaking, to have an effective boundary size of n pixels in the X (or Y) dimension, apply an inverse X (or Y) multiplier of the form n/X (or Y) multiplier to the boundary in the geometric space and then apply the X (or Y) multiplier in the screen space. A related technique is to apply an inverse X (or Y) multiplier of the form 1/X (or Y) multiplier to the boundary in the geometric space and then apply an X (or Y) multiplier of the form n*X (or Y) multiplier to the boundary in screen space.

The upper-right portion of FIG. 5C shows inverse scaling applied to boundary 554 in geometrical space, where boundary 554 has been scaled in the X (width) dimension by an inverse X multiplier of 1/5=0.2, and has been scaled in the Y (height) dimension by an inverse Y multiplier value of 1/1=1. After a shape with an anti-aliasing boundary, such as circle 552 and boundary 554, are drawn in the geometric space, the scaled shape and anti-aliasing boundary can be scaled, translated, and perhaps otherwise transformed to be drawn into a raster. In scenario 550, the raster includes at least a 12×54 grid of pixels.

The center portion of FIG. 5C shows circle 552 and boundary 554 drawn in raster 556. Raster 556 is shown in FIG. 5C as a 12×54 grid of pixels. In scenario 550, opacity values for each pixel in raster 556 can be determined as discussed above for scenario 520—that is, an opacity for each pixel whose pixel center is in the interior of the shape can be set to 1, an opacity for each pixel whose pixel center is outside of the boundary can be set to 0, and an opacity of each remaining pixel can be set to D (or a value based on D), where D is a distance from the pixel center to the outside edge of the boundary. As also discussed above, other techniques can be utilized to determine opacity values. In scenario 550, as with scenario 520, D is determined in tenths of pixel units.

Using the D values, opacity values can be determined for each pixel in raster 556. Opacity ($\alpha$) grid 558, shown in a lower portion of FIG. 5C, indicates opacity values can be determined for each pixel in raster 526. In some embodiments, opacity grid 558 need not be explicitly formed as discussed above in the context of opacity grid 528.

As with opacity grid 528 of scenario 520, opacity grid 558 uses the minimum opacity value of 0 for non-drawn pixels (fully transparent), a value of "x" for a drawn pixel whose pixel center is in the interior of circle 552 and so is assigned the a maximum opacity value of 10, and values between 1 and 9 for drawn pixels whose pixel centers are within boundary 554.

The bottom portion of FIG. 5C shows an example image 560, with grid lines of color (128, 128, 128), which is a shade of gray, added for clarity. Image 560 depicts an ellipse having a black color (RGB value of (0, 0, 0)) on a white background (RGB value of (255, 255, 255)) With respect to opacity value grid 558, "X" values take on the color of the circle=(0, 0, 0) in image 560, "0" values in opacity grid 558 take on the color of the background=(255, 255, 255) in image 560, and values between "1" and "9" take on part of the color of the circle and part of the color of the background based on the specific opacity value, as discussed above. After rendering image 560, scenario 550 can be completed.

Example Data Network

Figure 6:
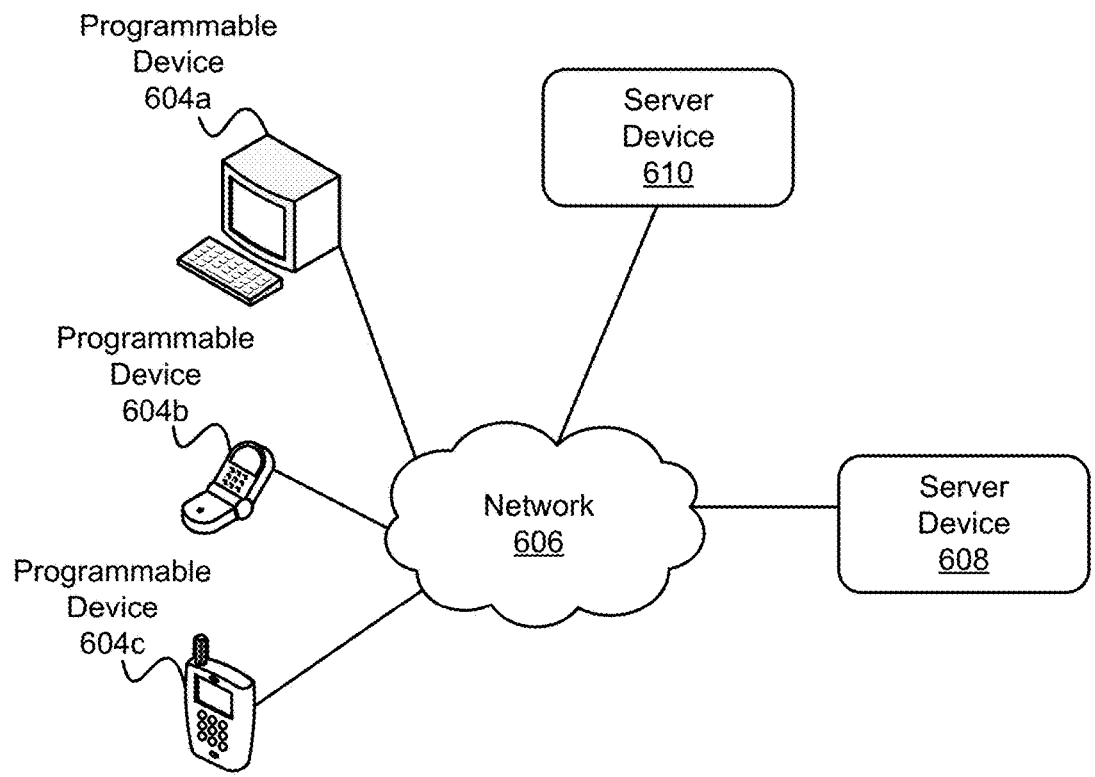
FIG. 6 depicts a distributed computing architecture, in accordance with an example embodiment.

FIG. 6 shows server devices 608, 610 configured to communicate, via network 606, with programmable devices 604a, 604b, and 604c. Network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet.

Although FIG. 6 only shows three programmable devices, distributed application architectures may serve tens, hundreds, or thousands of programmable devices. Moreover, programmable devices 604a, 604b, and 604c (or any additional programmable devices) may be any sort of computing device, such as an ordinary laptop computer, desktop computer, network terminal, wireless communication device (e.g., a cell phone or smart phone), and so on. In some embodiments, programmable devices 604a, 604b, and 604c may be dedicated to the design and use of software applications. In other embodiments, programmable devices 604a, 604b, and 604c may be general purpose computers that are configured to perform a number of tasks and need not be dedicated to software development tools.

Server devices 608, 610 can be configured to perform one or more services, as requested by programmable devices 604a, 604b, and/or 604c. For example, server device 608 and/or 610 can provide content to programmable devices 604a-604c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 608 and/or 610 can provide programmable devices 604a-604c with access to software for database, search, computation, graphical, audio, video, World Wide Web/Internet utilization, and/or other functions. Many other examples of server devices are possible as well.

Computing Device Architecture

Figure 7A:
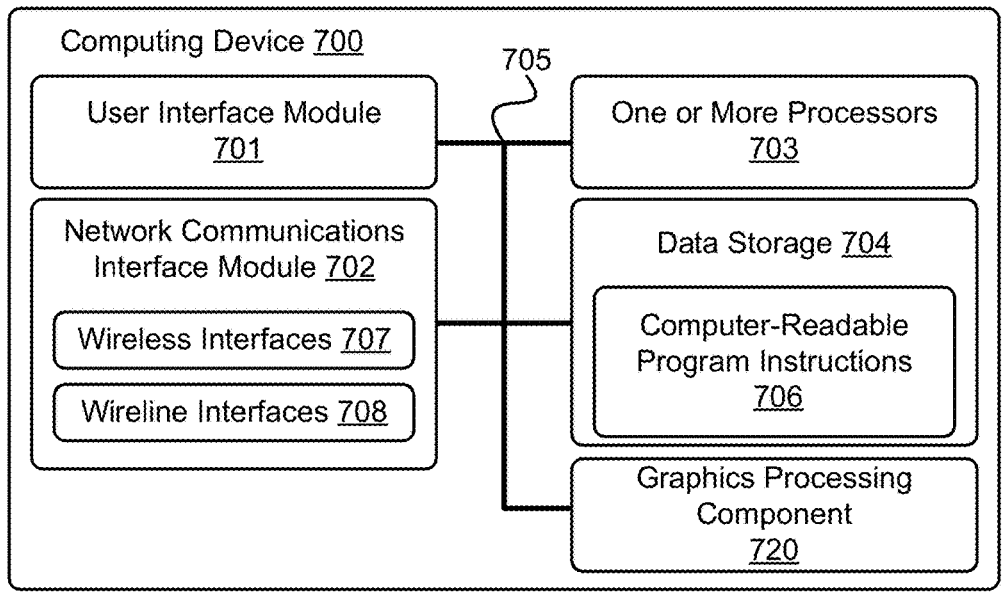
FIG. 7A is a block diagram of a computing device, in accordance with an example embodiment.

FIG. 7A is a block diagram of a computing device (e.g., system) in accordance with an example embodiment. In particular, computing device 700 shown in FIG. 7A can be configured to perform one or more functions of mobile device 302, server devices 608, 610, network 606, and/or one or more of programmable devices 604a, 604b, and 604c. Computing device 700 may include a user interface module 701, a network-communication interface module 702, one or more processors 703, data storage 704, and graphics processing component 720, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706a that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706 and perhaps additional data, such as but not limited to data used by one or more processes and/or threads of a software application. In some embodiments, data storage 704 can additionally include storage required to perform at least part of the herein-described methods and techniques and/or at least part of the functionality of the herein-described devices and networks.

Graphics processing component 720 can be, and or include, hardware, firmware, and/or software configured to perform some or all of the tasks used in rendering imagery, perhaps for display using a user display device of user interface module 701. For example, graphics processing component 720 can include, but is not limited to, one or more graphics processing units (GPUs), graphics co-processors, graphics pipelines, graphics libraries, graphics software, computer-readable memories partially or entirely dedicated for graphics operations, and rendering engines. In some embodiments, part or all of the functionality of graphics processing component 720 can be performed by user interface module 701, processors 703, data storage 704, and/or instructions 706.

Cloud-Based Servers

Figure 7B:
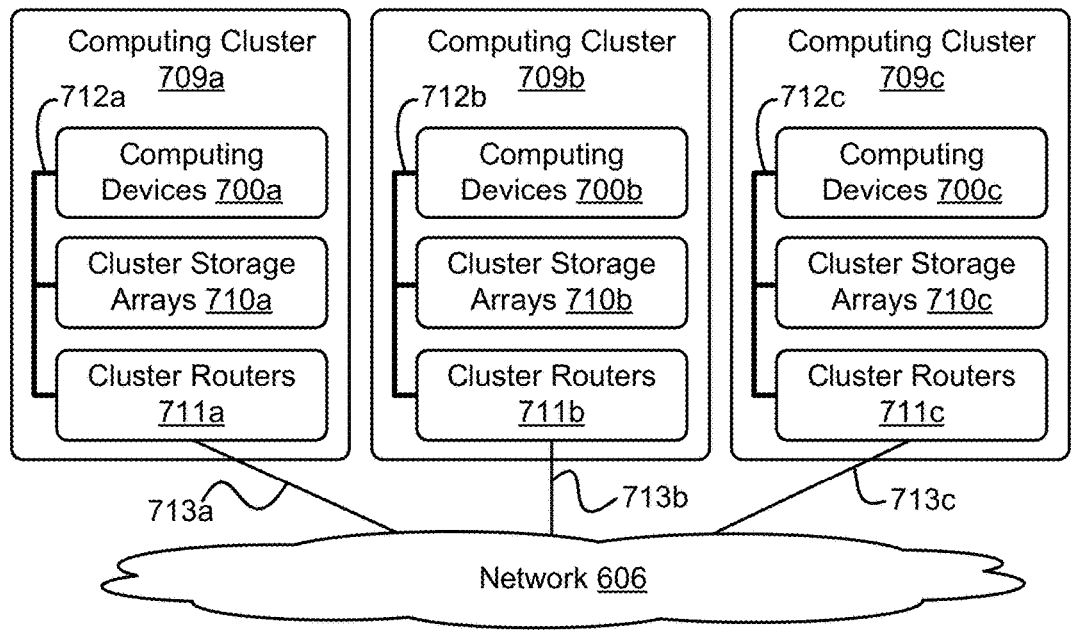
FIG. 7B depicts a cloud-based server system, in accordance with an example embodiment.

FIG. 7B depicts a network 606 of computing clusters 709a, 709b, 709c arranged as a cloud-based server system in accordance with an example embodiment. Server devices 608 and/or 610 can be cloud-based devices that store program logic and/or data of cloud-based applications and/or services. In some embodiments, server devices 608 and/or 610 can be a single computing device residing in a single computing center. In other embodiments, server device 608 and/or 610 can include multiple computing devices in a single computing center, or even multiple computing devices located in multiple computing centers located in diverse geographic locations. For example, FIG. 6 depicts each of server devices 608 and 610 residing in different physical locations.

In some embodiments, data and services at server devices 608 and/or 610 can be encoded as computer readable information stored in non-transitory, tangible computer readable media (or computer readable storage media) and accessible by programmable devices 604a, 604b, and 604c, and/or other computing devices. In some embodiments, data at server device 608 and/or 610 can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of server device 608 and/or 610 can be distributed among three computing clusters 709a, 709b, and 708c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of server 608. In one embodiment, the various functionalities of server 608 can be distributed among one or more of computing devices 700a, 700b, and 700c. Computing devices 700b and 700c in computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with server devices 608 and/or 610 can be distributed across computing devices 700a, 700b, and 700c based at least in part on the processing requirements of server devices 608 and/or 610, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 608 and/or 610 can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of server device 608, while other cluster storage arrays can store data of server device 610. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 701a via the local cluster network 712a, and (ii) wide area network communications between the computing cluster 709a and the computing clusters 709b and 709c via the wide area network connection 713a to network 606. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    displaying a first set of polygons of a shape having a first current size on a display of a computing device, wherein the first current size is associated with at least a first multiplier value for the first set of polygons;
    receiving, at the computing device, an instruction to draw the shape having a second current size;
    determining a second multiplier value for the shape using the computing device, wherein the second current size is associated with the second multiplier value;
    determining whether retessellation is to be performed for the shape based on the first multiplier value and the second multiplier value;
    after determining that retessellation is to be performed, determining a second set of polygons that tessellate the shape based on the second multiplier value using the computing device, wherein the second set of polygons comprises two or more polygons, and wherein the second set of polygons differs from the first set of polygons; and
    displaying one or more polygons of the second set of polygons on the display.

2. The method of claim 1, wherein the first multiplier value is associated with a first dimension.

3. The method of claim 2, wherein the second multiplier value is also associated with the first dimension.

4. The method of claim 2, wherein the first current size is associated with at least the first multiplier value for the first set of polygons and a third multiplier value for the first set of polygons, and wherein the third multiplier value is associated with a second dimension that differs from the first dimension.

5. The method of claim 4, wherein the second current size is further associated with a fourth multiplier value, the fourth multiplier value associated with the second dimension, and wherein determining whether retessellation is to be performed for the shape comprises determining whether retessellation is to be performed for the shape based on the first multiplier value, the second multiplier value, the third multiplier value, and the fourth multiplier value.

6. The method of claim 1, wherein the instruction is associated with a transformation matrix, and wherein displaying the first set of polygons comprises determining the first set of polygons based on the transformation matrix.

7. The method of claim 1, wherein determining the second set of polygons that tessellate the shape comprises determining the second set of polygons based on a scale factor, the scale factor based on the second multiplier value.

8. The method of claim 7, wherein the scale factor comprises a scale factor in an X dimension and a scale factor in a Y dimension, and wherein determining the set of polygons that tessellate the shape based on the scale factor comprises determining the set of polygons based on the scale factor in the X dimension and on the scale factor in the Y dimension.

9. The method of claim 1, wherein determining whether retessellation is to be performed for the shape based on the first multiplier value and the second multiplier value comprises determining whether retessellation is to be performed for the shape based on the first multiplier value and the second multiplier value and one or more additional criteria for retessellation; the one or more criteria for retessellation comprise one or more of: a criterion based on a size of the shape, and a criterion based on an indicator for anti-aliasing the shape.

10. The method of claim 1, further comprising:
    determining an indicator for anti-aliasing the shape; and
    wherein determining the second set of polygons that tessellate the shape is further based on the indicator for anti-aliasing the shape.

11. A computing device, comprising:
    a graphics processing component;
    a display;
    a processor; and
    non-transitory computer-readable memory having one or more instructions that, when executed by the processor, cause the computing device to perform functions comprising:
        displaying a first set of polygons of a shape having a first current size on the display, wherein the first current size is associated with at least a first multiplier value for the first set of polygons;
        receiving an instruction to draw the shape having a second current size;
        determining a second multiplier value for the shape, wherein the second current size is associated with the second multiplier value;
        determining whether retessellation is to be performed for the shape based on the first multiplier value and the second multiplier value;
        after determining that retessellation is to be performed, determining a second set of polygons that tessellate the shape based on the second multiplier value using the computing device, wherein the second set of polygons comprises two or more polygons, and wherein the second set of polygons differs from the first set of polygons; and
        displaying one or more polygons of the second set of polygons on the display.

12. The computing device of claim 11, wherein the first multiplier value and the second multiplier value are both associated with a first dimension.

13. The computing device of claim 12, wherein the first current size is associated with at least the first multiplier value for the first set of polygons and a third multiplier value for the first set of polygons, and wherein the third multiplier value is associated with a second dimension that differs from the first dimension.

14. The computing device of claim 13, wherein the second current size is further associated with a fourth multiplier value, the fourth multiplier value associated with the second dimension, and wherein determining whether retessellation is to be performed for the shape comprises determining whether retessellation is to be performed for the shape based on the first multiplier value, the second multiplier value, the third multiplier value, and the fourth multiplier value.

15. The computing device of claim 11, wherein determining the second set of polygons that tessellate the shape comprises determining the second set of polygons based on a scale factor, the scale factor based on the second multiplier value.

16. The computing device of claim 15, wherein the scale factor comprises a scale factor in an X dimension and a scale factor in a Y dimension, and wherein determining the set of polygons that tessellate the shape based on the scale factor comprises determining the set of polygons based on the scale factor in the X dimension and on the scale factor in the Y dimension.

17. The computing device of claim 11, wherein determining whether retessellation is to be performed for the shape based on the first multiplier value and the second multiplier value comprises determining whether retessellation is to be performed for the shape based on the first multiplier value and the second multiplier value and one or more additional criteria for retessellation; the one or more criteria for retessellation comprise one or more of: a criterion based on a size of the shape, and a criterion based on an indicator for anti-aliasing the shape.

18. The computing device of claim 11, the functions further comprising:

determining an indicator for anti-aliasing the shape; and
wherein determining the second set of polygons that tessellate the shape is further based on the indicator for anti-aliasing the shape.

19. A method, comprising:
determining, at a computing device, to render a shape having a boundary using a grid of pixels;
determining one or more scale factors associated with one or more axes of the shape at the computing device;
rendering the shape using the grid of pixels by at least:
determining a size of the boundary of the shape in the grid of pixels based on the one or more scale factors, and
determining an opacity value for each pixel in the grid of pixels, wherein an opacity value for a boundary pixel representing the boundary range from a minimum opacity value to a maximum opacity value depending on a distance from a pixel center of the boundary pixel to an outside edge of the boundary; and
providing an output of the computing device based on the grid of pixels.

20. The method of claim 19, wherein determining the opacity value for each pixel in the grid of pixels comprises:
determining tessellation of the shape and a tessellation of the boundary of the shape; and
drawing the tessellation of the shape and a tessellation of the boundary of the shape into the grid of pixels by at least:
determining that an opacity value for an pixel whose center is inside the tessellation of the shape is the maximum opacity value,
determining that an opacity value for an pixel whose center is outside the tessellation of the boundary of the shape is the minimum opacity value, and
determining that an opacity value for an pixel whose center is within the tessellation of the boundary of the shape is in a range between the minimum opacity value and the maximum opacity value.

* * * * *